US011095601B1

(12) United States Patent
Wilson et al.

(10) Patent No.: US 11,095,601 B1
(45) Date of Patent: Aug. 17, 2021

(54) CONNECTION TIER STRUCTURE DEFINING FOR CONTROL OF MULTI-TIER PROPAGATION OF SOCIAL NETWORK CONTENT

(71) Applicant: INTERNATIONAL BUSINESS MACHINES CORPORATION, Armonk, NY (US)

(72) Inventors: John D. Wilson, League City, TX (US); Shikhar Kwatra, Raleigh, NC (US); Paul Krystek, Highland, NY (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/923,128

(22) Filed: Jul. 8, 2020

(51) Int. Cl.
*G06F 15/16* (2006.01)
*H04L 12/58* (2006.01)

(52) U.S. Cl.
CPC .............. *H04L 51/34* (2013.01); *H04L 51/16* (2013.01); *H04L 51/32* (2013.01)

(58) Field of Classification Search
CPC ......... H04L 51/34; H04L 51/32; H04L 51/16; H04L 67/22; G06Q 50/01; G06F 16/24578
USPC ................ 709/204, 205, 206, 224; 705/319; 707/748
See application file for complete search history.

(56) References Cited

U.S. PATENT DOCUMENTS

| 7,299,222 | B1 | 11/2007 | Hogan |
| 8,825,644 | B1 | 9/2014 | Crichton |
| 8,825,759 | B1 | 9/2014 | Jackson |
| 9,292,830 | B2 | 3/2016 | Fleet |
| 10,152,544 | B1 * | 12/2018 | Friggeri ................. G06N 5/003 |
| 10,547,582 | B1 | 1/2020 | Kwatra |

(Continued)

FOREIGN PATENT DOCUMENTS

CA 3045190 A1 7/2018

OTHER PUBLICATIONS

Grace Period Disclosure: "Methods and Systems for Managing Distribution of Online Content Based on Content Maturity", John Wilson, Shikhar Kwatra, Paul Krystek, Sarbajit Rakshit, U.S. Patent Application Publication No. 2020/0169588, published May 28, 2020.

(Continued)

*Primary Examiner* — Johnny B Aguiar
(74) *Attorney, Agent, or Firm* — Caleb D. Wilkes

(57) ABSTRACT

A method, a computer system, and a computer program product may perform tier structure definition and control of multi-tier propagation of social network content. For a user and his connections in the social network, interaction data may be received and analyzed to determine a strength of their relationship to the user. A tier structure may be defined, with the first tier having a greatest level of relationship to the user. Each connection may be assigned to a tier based on the strength of relationship. An initial propagation of a post of the user may be limited to connections from the first tier. Feedback to the post in the social network is monitored to determine a level of maturation of a thread. Feedback may be provided by the connections of the first tier. If the thread satisfies a maturity threshold, the thread is propagated to connections in a second tier.

20 Claims, 14 Drawing Sheets

(56) References Cited

U.S. PATENT DOCUMENTS

| | | |
|---|---|---|
| 2010/0131385 A1 | 5/2010 | Harrang |
| 2012/0167010 A1 | 6/2012 | Campbell |
| 2013/0103814 A1 | 4/2013 | Carrasco |
| 2013/0246521 A1* | 9/2013 | Schacht ............. G06Q 10/10 709/204 |
| 2013/0290820 A1* | 10/2013 | Dhanani ............. G06Q 50/01 715/205 |
| 2014/0223289 A1 | 8/2014 | Zheng |
| 2014/0237093 A1 | 8/2014 | Hofman |
| 2014/0280236 A1 | 9/2014 | Faller |
| 2015/0067849 A1 | 3/2015 | Agrawal |
| 2015/0081449 A1* | 3/2015 | Ge ............... G06Q 30/0269 705/14.66 |
| 2015/0286662 A1 | 10/2015 | Marra |
| 2015/0370830 A1 | 12/2015 | Murphy-Chutorian |
| 2016/0179965 A1 | 6/2016 | Bhatia |
| 2016/0328481 A1 | 11/2016 | Marra |
| 2017/0068722 A1* | 3/2017 | Wang ............... G06Q 30/0201 |
| 2018/0039644 A1 | 2/2018 | Bonanni |
| 2018/0183852 A1* | 6/2018 | Jackson ............. G06Q 10/107 |
| 2018/0285984 A1* | 10/2018 | Ayachitula ......... G06Q 50/01 |
| 2019/0102466 A1* | 4/2019 | Wang ............... G06F 16/9535 |
| 2020/0134095 A1 | 4/2020 | Weldemariam |

OTHER PUBLICATIONS

Mell et al., "The NIST Definition of Cloud Computing", National Institute of Standards and Technology, Special Publication 800-145, Sep. 2011, 7 pages.

\* cited by examiner www.socialnetworkwebsite.com

SOCIAL NETWORK

| | | |
|---|---|---|
| USER<br><br>JOHN<br>JOHNSON | Enjoying vacuuming with my new vacuum | |
| Connection<br>Alan | Did you buy it yourself or did Sally get it? | |
| | Sally ordered it online, but the drone delivered it to us | John Johnson |
| Connection<br>Jeannie | What is the brand and model? | |
| | It is a Hollis 680. The motor is really quiet | John Johnson |
| Connection<br>Phyllis | Oh my niece has that one. Her family loves it | |
| Connection<br>Clarence | Are you vacuuming at your house? What room are you vacuuming? | |
| | The living room. A lot of crumbs leftover from the tea party today | John Johnson |
| Connection<br>Candy | I thought you got a new one last summer | |
| | We gave that one to Alan because his fell into the fish pond | John Johnson |
| Connection<br>Otis | Were any fish harmed? | |
| Connection<br>Jenny | You should get a robot vacuum. | |
| | Vacuuming is relaxing for me. I like the exercise | John Johnson |
| Social Network | At what room temperature do you like to vacuum? | |
| Social Network | Is the Hollis 680 your favorite vacuum ever? | |

FIG. 10

CONNECTION TIER STRUCTURE DEFINING FOR CONTROL OF MULTI-TIER PROPAGATION OF SOCIAL NETWORK CONTENT

STATEMENT REGARDING PRIOR DISCLOSURES BY THE INVENTORS

The following disclosure is submitted under 35 U.S.C. 102(b)(1)(A): DISCLOSURE: ["METHODS AND SYSTEMS FOR MANAGING DISTRIBUTION OF ONLINE CONTENT BASED ON CONTENT MATURITY", John Wilson, Shikhar Kwatra, Paul Krystek, Sarbajit Rakshit, U.S Patent Application Publication No. 2020/0169588, published May 28, 2020.]

BACKGROUND

The present invention relates generally to social media and social networks.

Custom websites and applications enable participants to create and share content and to participate in social networking. These websites and applications are often referred to as social media or social networks. Once a user posts content into a social media application, i.e. into a social network, with a written message, an audio message, and/or a video, often the other users of the social network who are connected to the original user can see and/or hear and respond to the posted content of the original user. Over time, a user of a social network can make hundreds or thousands of connections with other users in the social network who can observe or listen to posts made by the user in the social network.

SUMMARY

Embodiments of the present invention include a method, a computer system, and a computer program product for tier structure definition and for control of multi-tier propagation of social network content. Interaction data from a first user of a social network and from additional users of a social network may be received. The additional users may be connections of the first user in the social network. The interaction data may be analyzed such that a strength of relationship for each connection with respect to the first user is determined. A tier structure in the social network may be defined for the connections of the first user. The tier structure may include a plurality of tiers. Each tier of the tier structure may correspond to a strength level of the relationship. A first tier of the tier structure may correspond to a greatest level of the relationship to the first user. Each connection of the first user in the social network may be assigned to one of the tiers of the tier structure based on the strength of the relationship. For a post of the first user in the social network, an initial propagation of the post may be limited to connections of the first tier. Feedback to the post in the social network may be monitored such that a level of maturation of a thread is determined. The feedback may be provided by the connections of the first tier. The post and the feedback may together form the thread. In response to determining that the thread has satisfied a maturity threshold, the thread may be propagated to connections of a second tier of the tier structure.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 10 illustrates an example of an additional embodiment according to the invention in which the program contributes to thread maturation;

DETAILED DESCRIPTION

Figure 1:
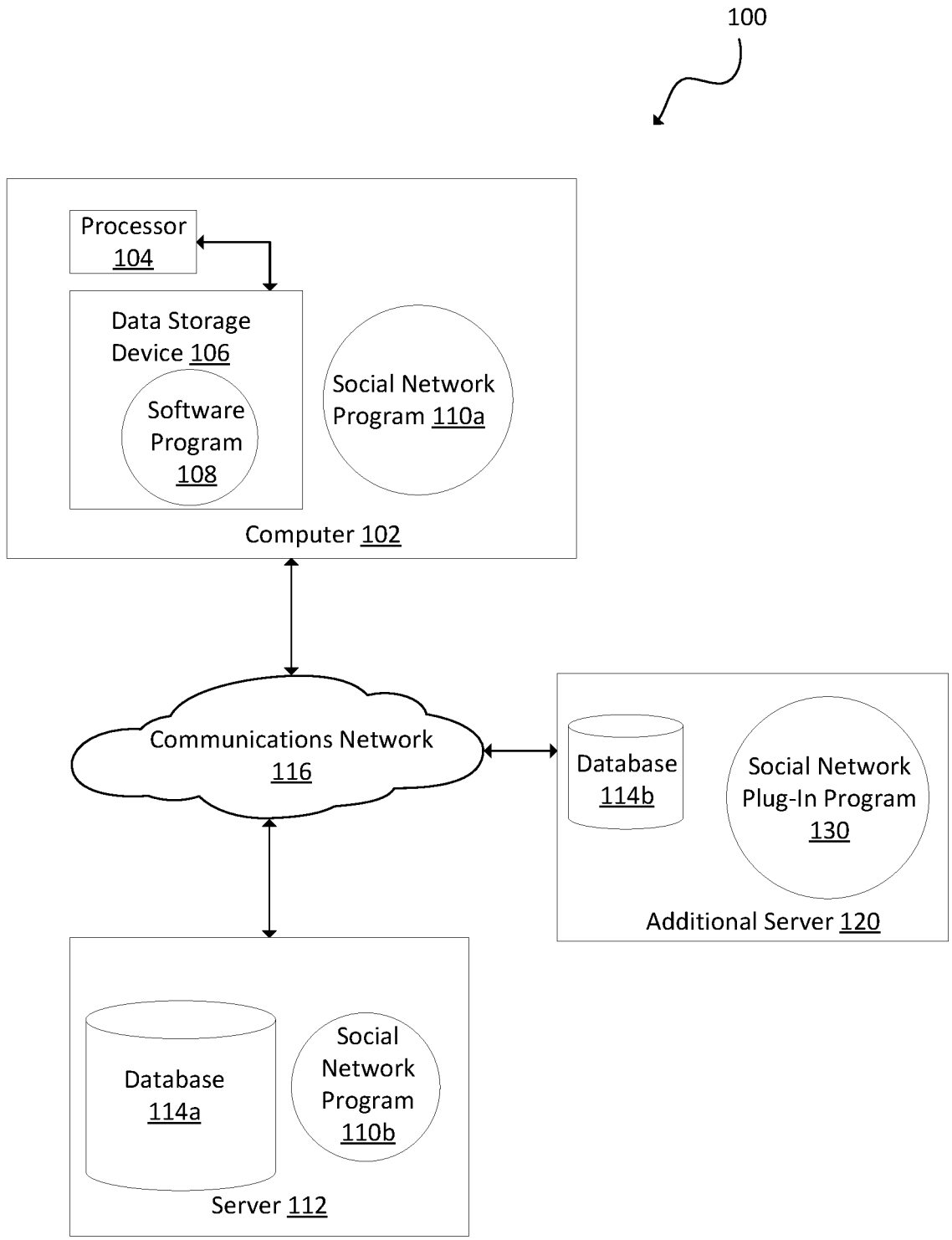
FIG. 1 illustrates a networked computer environment according to at least one embodiment.

Embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, system, and computer program product for organizing connections in a social network to achieve improved control of content propagation. As such, the present embodiments have the capacity to improve the technical field of social networks by more efficiently moving shared content through the social network. A processor organizing social network connections into various tiers based on a level of relationship strength helps more efficiently use computing resources of the social network. Primary computing resources of the social network may be focused or reserved for communication of a user with those connections who are closest to the user.

Social network users often post content of some form into the social network. The content can include text, video, and/or audio. Connections in the social network can see and/or hear the post and then have an opportunity to respond to the post. The original post and the responses together form a subject thread. Social network content is often formed from contributions by many connections, i.e. users or people of the social media. Through the gathering of feedback and through subsequent postings from various connections, i.e. people, within the social network, the overall content contained within the original posting and within related threads matures. For example, a shared album is created where multiple people can contribute which helps the shared album gradually mature. Once any social network content is posted, then the same content is shared with connections in the social network.

For some social networks, a user of the social network typically can make a connection in the social network by finding a public profile of another user of the social network and extending an invitation through the social network to the other user. The invitation is for the other user to become a connection to the first user in the social network. The other user then has an opportunity to accept, decline, or ignore the invitation. Before the two users create the connection in this manner, each has a limited ability to observe the social network interactions of the other. For example, the unconnected users may not be able to see a majority of posts from the other user. The two unconnected users also may not be able to use instant messaging or video chat through the social network to communicate with each other.

For some social networks, a user of the social network may choose to follow another user. In some instances, a first user can submit a request to a second user to ask the second user to permit the first user to be a follower of the second user. The two users may have limited or no access for interaction with each other through the social network or for observation of each other in the social network until the second user allows the first user to follow him or her and/or vice-versa.

In many instances, two people will have an interaction in person which will subsequently lead to them making a connection in a social network. A person may meet another person in a variety of ways—at a party, doing activities in the neighborhood, at a networking event, at a school event, etc. The people could make a social network connection there in person using their cell phones or could make a social network connection at some time after their in-person introduction.

Users of a social network may also use the social network for communication with family members and long-time friends. A social network user may send invitations to existing close friends or family to connect with him or her in the social network.

Over time, in one social network a user may accrue a large number of connections, even hundreds or thousands, who can observe or listen to posts made by the user in the social network. Some of those connections would represent close friends or close relatives. Some of those connections might be from short in-person interactions without long-term implications or might be from distant relatives or from friends of friends.

Different levels of social network interaction are appropriate for different types of connections in a social network.

Substantial computing resources are required for the social network to share all posts of users of the social network with every other connection in the social network. A user may want to share posts first with a portion of the total connections, and then subsequently with larger portions of the connections or with all of the connections. The close connections may provide helpful feedback to a post or a subject thread which will lead to the thread becoming more presentable and interesting for presentation to a larger audience. The close connections may also provide feedback that a post or a subject thread is inappropriate for sharing with a larger audience.

Feedback provided by connections who have the closest relationship with a user may be most helpful to improve the thread content and to help the thread mature. The connections from the first tier, e.g. who are close to a particular user, may have greater interest in the post from their close friend than casual friends/acquaintances of the user have. The connections from the first tier may have developed a greater synergy with a user than those of another tier have developed with that user and, therefore, are more suitable for providing valuable feedback to the post of the user. The feedback which is more valuable can help a maturity level of a thread more quickly achieve an improved thread maturity level. A user also may be uncomfortable having a frank discussion about a sensitive subject with casual acquaintances, and, therefore, may wish to reserve that conversation to be had amongst his or her closest connections.

Therefore, it may be advantageous to, among other things, provide a way to organize connections in a social network into tiers and propagate content into the various tiers based on feedback initially provided from the first tier. Thus, the closest connections to a user would have the greatest opportunity to help shape a thread content and discussion before the thread is passed to less close connections to the user.

According to at least one embodiment, interaction data from a first user of a social network and from additional users of a social network may be received. The additional users may be connections of the first user in the social network. The interaction data may be analyzed such that a strength of relationship for each connection with respect to the first user is determined. A tier structure in the social network may be defined for the connections of the first user. The tier structure may include a plurality of tiers. Each tier of the tier structure may correspond to a strength level of the relationship. A first tier of the tier structure may correspond to a greatest level of the relationship to the first user. Each connection of the first user in the social network may be assigned to one of the tiers of the tier structure based on the strength of the relationship. For a post of the first user in the social network, an initial propagation of the post may be limited to connections of the first tier. Feedback to the post in the social network may be monitored such that a level of maturation of a thread is determined. The feedback may be provided by the connections of the first tier. The post and the feedback may together form the thread. In response to determining that the thread has satisfied a maturity threshold, the thread may be propagated to connections of a second tier of the tier structure.

According to at least one embodiment, a program, e.g., a third-party plug-in program or the social network program, may use various techniques and tools to analyze connection interactions to determine in which tier of connections each connection belongs. The program may recognize interactions in the form of conversations, for example text chats via instant messaging, voice chats, video chats. Such exchanges can be recognized by the program and can cause the program to mark the participants of the exchanges as being in a close circle of connections or as potentially being in a close circle of connections.

In some embodiments of the invention, propagation of social network content can be aligned with gradual enhancement of content maturity. For example, when a content is posted, the content may first be shared with a first tier of connections having a close relationship to the user. If there are ten connections in the first tier, when one, some, or all the ten connections respond to the original post, the post may become a discussion thread or a subject thread. The connections may add additional content which evolves the thread. Once the maturity level of the thread reaches a first threshold maturity level, then the post may be shared in its current form and/or in a summary form with connections from a second tier of closeness to the user. The pattern may repeat so that further maturation of the thread past additional threshold levels will trigger the propagation of the thread content to a third tier and to a fourth tier, etc. The initial sharing may be limited to certain authenticated friends who have been classified as belonging to the first tier. The close connections may be considered reviewers who vote to determine thread propagation. The vote of the close connections may be used in a threshold determination. A thread maturity score for the thread may be generated to ascertain the level of thread maturity. As the maturity of the content continues to increase (e.g., via the auto-evolving mechanism of online content), the number of users to which the content is viewable also increases. That is, as the maturity level of the content increases, it may be considered to be appealing to a greater number of users or viewers (e.g., as indicated by the content maturity thresholds for the users/viewers), and thus shared with, sent to, and/or viewable by a greater number of viewers.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a social network program 110a. The networked computer environment 100 may also include a server 112 that is enabled to run a social network program 110b that may interact with a database 114a and a communication network 116. An additional server 120 with a database 114b and a social network plug-in program 130 may communicate with the server computer 112 and with the client computer 102 via the communications network 116. The networked computer environment 100 may include a plurality of computers 102, servers 112, and additional servers 120. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 and with the additional server computer 120 via the communications network 116. The communications network 116 may include connections, such as wire, wireless communication links, or fiber optic cables. As will be discussed with reference to FIG. 12, server computer 112 and additional server computer 120 may each include internal components 1202a and external components 1204a, respectively, and client computer 102 may include internal components 1202b and external components 1204b, respectively. Server computer 112 and additional server computer 120 may also operate in a cloud computing service model, such as Software as a Service (SaaS), Platform as a Service (PaaS), or Infrastructure as a Service (IaaS). Server 112 and additional server 120 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing databases 114a, 114b. According to various implementations of the present embodiment, the social network program 110a, 110b may interact with databases 114a, 114b that may be embedded in various storage devices, such as, but not limited to a computer/mobile device 102, a networked server 112, 120, or a cloud storage service.

An additional server 120 may communicate with the server computer 112 via the communications network 116 and may also communicate with the client computer 102 via the communications network 116. The additional server 120 may include a database 114b and a social network plug-in program 130 which is compatible to work with and supplement the operations of the social network programs 110a, 110b. The additional server 120 may be operated and controlled by the operator of the server 112 or by a third party. The third party may have worked with the operator to achieve compatibility of the plug-in program 130 with the social network programs 110a, 110b.

According to the present embodiment, a user using a client computer 102 or a server computer 112 may use the social network program 110a, 110b to communicate and share content with connections in the social network. The plug-in program 130 may access the database 114a of the server 112 to obtain the data to perform connection relationship analysis and to perform tier organization for the connections of the user.

Figure 2:
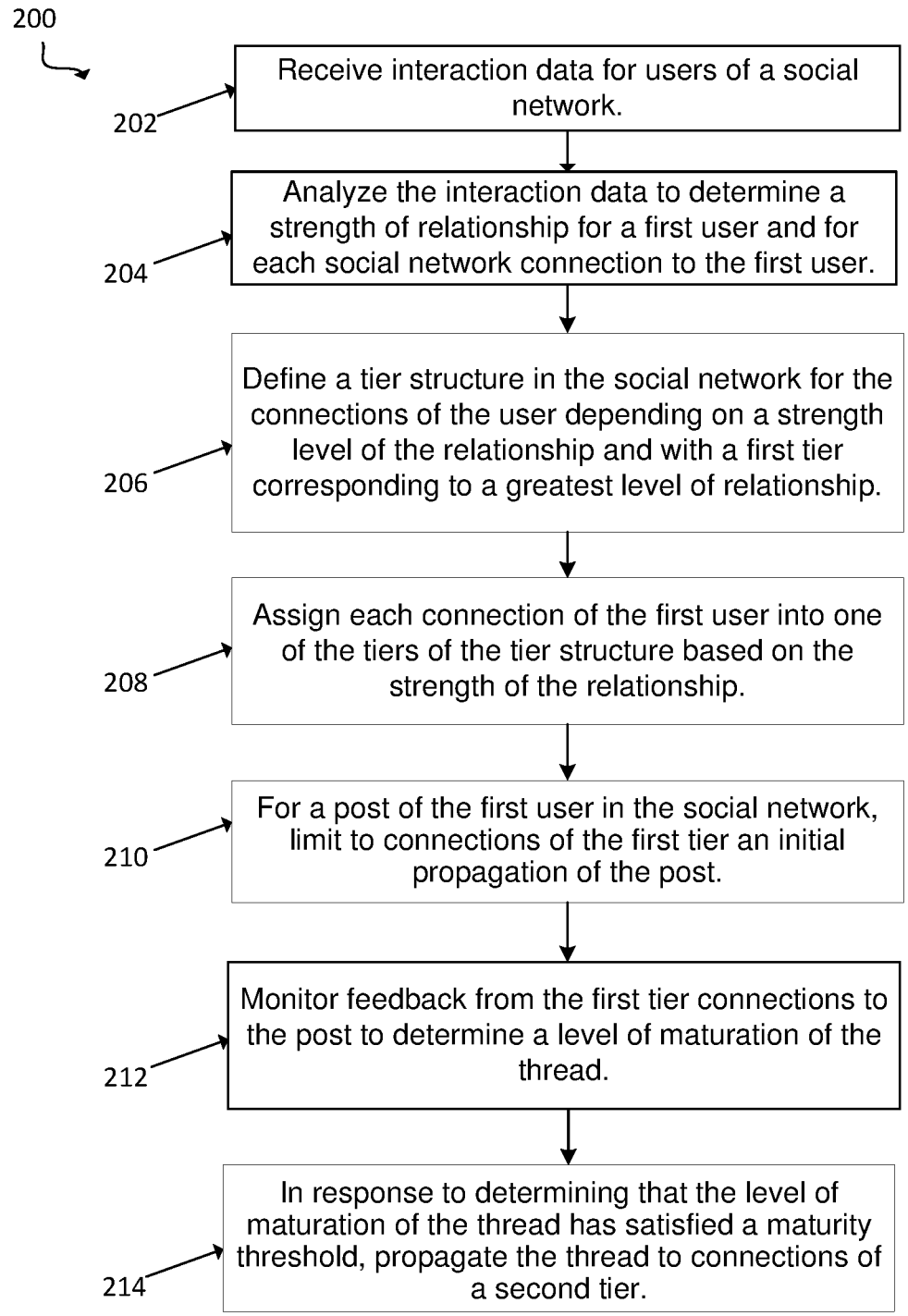
FIG. 2 is an operational flowchart illustrating a process of connection tier organization and multi-tier propagation control of social network content according to some embodiments of the invention.

Referring now to FIG. 2, an operational flowchart illustrating the exemplary tier organization and content propagation process 200 used by the social network plug-in program 130 according to at least one embodiment is depicted. In alternative embodiments, the method may be performed by the social network programs 110a, 110b instead of via a third-party plug-in program.

At step 202, interaction data for users of a social network are received, e.g., for the interactions of a first user of a social network and for the interactions of additional users of a social network. According to at least one embodiment, the additional server 120 may receive interaction data from one or more client computers 102 or from the server 112 that are produced as a result of interactions between users to which the client computers 102 are assigned. The interaction data may be generated from interactions in the form of conversations between the users to which client computers 102 are assigned, for example text chats via instant messaging, voice chats, or video chats that occur through the social network program 110a, 110b. In addition or in alternative, the interaction data may be generated from interactions in the form of conversations between users to which client computers 102 are assigned that occur via the client computers 102 outside of the social network program 110a, 110b, for example via cell phone calls or via SMS or MMS text messaging.

Interaction data may also be received via manual input from a first user of the social network in that a user provides relationship information that is received by the additional server 120. For example, the plug-in program 130 may cause the social network program 110a, 110b to generate a graphical user interface (GUI) in the social network which asks for interaction data in the form of relationship information about a user's connections in the social network. In this way, a user could provide interaction data which indicates that a connection is a close relative, e.g., a son or daughter, a parent, a sibling, a cousin, etc., or is a close friend. Alternatively, the plug-in program 130 may generate a graphical user interface (GUI) on one of the user's computer devices outside of the social network, with the GUI asking for interaction data in the form of relationship information from the user.

Interaction data may also be based on interests and special interest groups expressed by a user in a social network. A special interest group in a social network may be related to a hobby, a political group or cause, a public company which sells products, a non-profit cause, a volunteer group, etc. Each such special interest group may have some type of entity or social network identity created in the social network, and users of the social network may interact in the social network with that social network identity. In at least one embodiment, the social network plug-in program 130 uses an application programming interface (API) call to retrieve the special interest group interactions, e.g., groups joined, likes made, comments made, of a user in a social network.

In at least one embodiment, the social network plug-in program 130 may use an application programming interface (API) of the social network program 110a, 110b to query the social network to gather and receive the interaction data.

In at least one embodiment, interaction data may be received exclusively from interactions that occur between a user and his or her connections in a single social network. Alternatively or in addition, interaction data may be received regarding interactions that occur via all devices registered between two individuals, for example interactions that occur via phone calls or SMS or MMS text messaging that occur outside of the social network or that occur using other websites, communication platforms, or social networks. The registered devices may be referred to as assigned computing nodes, e.g., computing nodes assigned to the user and respective computing nodes assigned to each connection. The plug-in program 130 may generate a GUI to send to assigned computing nodes of users to obtain consent to have the interaction data from the devices to be sent to and received by the additional server 120 that hosts the plug-in program 130 and/or to the server 112 that hosts the social network program 110b in order for the interaction analysis, tier definition and assigning, and content propagation control to be performed.

Interaction data may include information about a number of interactions between a first user and his or her connections. Interaction data may also include information about a sentimental quality of the interactions between the first user and his or her connections. The interaction data may contain the actual textual word messages exchanged in an interaction, may contain the actual voice recordings exchanged in an interaction, and may contain actual video recordings exchanged in an interaction.

At step 204, the interaction data is analyzed to determine a strength of relationship for a first user and for each social network connection to the first user. In other words, a strength of relationship for each connection with respect to the first user is determined via the analysis of the interaction data. Interaction data from the numerous connections for a user in a social network may be reviewed and analyzed to determine relationship strengths which may indicate which connections are close to the user, which connections are less close to the user, and which connections are at best casual or distant. In at least some embodiments, the interaction data analysis and relationship strength determination may be performed by a processor of the additional server 120 with the results being saved in a memory of the database 114b of the additional server 120. Additionally or alternatively, the interaction data analysis and relationship strength determination may be performed by a layer in a cloud computing environment.

In at least some embodiments, the plug-in program 130 or the social network program 110a, 110b may use various techniques and tools to analyze the interaction data to determine the strength of relationship between a user and his or her connections. Through the analysis, participants of the exchanges or interactions may be marked or indicated as being in a close circle of connections or as potentially being in a close circle of connections. A tone analyzing program and/or speech-to-text transcription may be used to determine a sentimental quality of an interaction. A quantity of interactions, e.g. instant messaging messages that are shared, audio conversations that are held, or video conversations that are held, may be analyzed by being counted to determine a strength of relationship between two or some connections.

For video chats or audio chats, speech-to-text software may be used to convert or transcribe an audio exchange to text. Then, natural language processing (NLP) may be used to parse semantics and syntax from the exchanged information to identify a level of formality for the conversation. For example, if a conversation includes many colloquial phrases, then the likelihood increases that the connection is a close friendly connection instead of a formal business connection, resulting in a higher relationship score. The written text may be compared with a dictionary of known words saved in a database which are traditionally associated with a positive interaction. An LDA (Latent Dirichlet allocation) algorithm may be used as part of the NLP to perform topic classification of matters discussed in exchanges between connections of the social network.

At least in some embodiments, voice analysis software may be used to help generate a relationship strength score for the participants in a video or audio conversation. The voice analysis software may detect emotions or stress in both participants in a conversation by analyzing one or more of tone, pitch, tempo, syllable emphasis, Mel-frequency cepstral coefficients, energy, and amplitude in the voices of the participants.

Social networks often include public communication features for public communication that is visible or accessible to many connections. Social networks also often include private communication features that are visible or accessible only to the direct participants in an exchange. In at least one embodiment, interaction data from private exchanges may be analyzed to identify close social connections and to determine a relationship strength. In at least one embodiment, interaction data from public exchanges may be analyzed to identify close social connections and to determine a relationship strength. An emotion and tone analyzing program may be used to identify and classify a highly positive interaction indicative of a close relation, whether the exchange occurs via the public or private function.

Frequent public exchanges that happen when public feedback is left in the social network or when public response to the public posts of another user is made in the social network may also be analyzed and may indicate that the two involved are close connections.

An absence of any interaction data between connections in a social network may, for example, occur because public or private exchanges are not occurring between the two people and/or because no common interests are indicated in the social network. This absence of interaction data may indicate that the two connected are not close. Thus, an absence of any private or public exchanges may be analyzed and result in a low relationship strength score or in a lowest relationship strength score for a particular connection to a social network user.

Interaction data that includes negative interactions in private or public exchanges between connections in a social network may indicate that the two connected are not close. For example, if words in exchanged messages are recognized that are associated with bickering, this information may be used to give a low relationship strength score or the lowest relationship strength score to that particular relationship. A program that performs speech-to-text transcription with text analysis or a voice analysis software may be used to identify and classify a negative interaction. Words recognized may be compared with a dictionary of words saved in a database that are traditionally associated with hostility or a negative interaction. Tone in spoken words may be identified by voice analysis software as indicating hostility or a negative interaction.

According to at least one embodiment, a user could also manually designate a connection for the first tier or for another tier by directly entering a relationship into a social network database via a GUI created by the social network or by the plug-in program 130. For example, the social network program 110a, 110b may include a GUI or an API for manual relationship classification and direct a user to input information that indicates whether a connection is a close relative, e.g., a son or daughter, a parent, a sibling, a cousin, etc., or is a close friend, and may direct the user to pre-set that those relations are to be included into the first tier or into another tier. A graphical user interface may be generated in the social network that allows a user to set preferences and then store preferences in data storage such as a database.

Connections to a user in a social network may also be classified into different groups or tiers by using k-means clustering based on interests, similarities, or commonalities to the user. It may be recognized that the user and other connections both frequently interact with a common object in the social network such as a special interest group. One or more instances of such shared interest may cause the program to classify the connection in a close tier, e.g., a first tier or a second tier, for the user. The special interest group may be related to a hobby, a political group or cause, a public company which sells products, a non-profit cause, a volunteer group, etc. Each such special interest group may have some type of entity or social network identity created in the social network, and users of the social network may interact with that social network identity. Common interaction with an object or special interest group may be considered an indirect interaction of the user and his or her connections.

To analyze the interactions of a user and connections to the user in the social network, the program may also use natural language processing to perform semantic or syntactic analysis of feedback provided by a connection to a user. If a connection regularly provides responses to posts in the social network by the user, then such responses can be indications of a close relation. If the responses are usually positive or usually provide helpful feedback that spur thread maturation and thread evolvement, then the relationship between the user and the connection may be determined as being stronger. If the responses from a connection include many approvals without comments that help develop a thread maturation, then the relationship may be analyzed as having an average strength. If the responses from a connection are recognized as frequently being antagonistic or expressing disagreement, then the relationship may be analyzed as having a low strength.

A pattern of how a particular user appreciates any social network content and how the user contributes to the social network content may be analyzed to determine or to help determine a strength level of a relationship. For example, it may be analyzed and identified whether a user indicates an approval of any content even for posts that have not received any verbal, textual, or audio responses. It may also be analyzed and identified whether a particular user regularly contributes to content by asking questions or by adding additional contents in the comments section, even if that user presses the approval button.

At step 206, a tier structure in the social network is defined for the connections of the first user. The tier structure includes a plurality of tiers. Each tier depends on a strength level of the relationship. A first tier of the tier structure corresponds to a greatest level of the relationship.

The program may create a tier structure with two tiers, three tiers, four tiers, etc. In at least some embodiments, a first tier of the tier structure represents those connections who are most closely connected to the user. For the connections of the first tier, the user may have the greatest amount of interactions with those users, e.g., the greatest number of direct interactions via textual, audio, or video messages or conversations exchanged or shared with each other. The user may share the largest number of common interests with those connections in the first tier. For example, the program may recognize that connections are each frequently interacting with common special interest groups in the social network. The program may also define relationship strength levels for the various tiers based on a combination of direct interactions and on common interests shared. The common interests shared may be considered an indirect interaction.

In at least some embodiments, a database for a third-party plug-in program, e.g., database 114b that works with social network plug-in program 130, may store related activities and content followed (or viewed, consumed, etc.) by the user (e.g., via a computing node) and followed by connections to the user. The data may be categorized within one objective output set with the respective information/keywords/highlights of the activity. The received data may be analyzed, and key words may be identified. The data may then be categorized by name of person, name of an activity, name of a place, etc., and stored in the database. Multiple sets of such relationships (e.g., one for each of the user's contacts, friends, connections, etc. within the system) may be created and stored in the database associated with each user.

Each tier that is more distant in the tier structure may correspond to a lower level of relationship strength between the user and connections as determined, e.g., by the plug-in program. For example, a second tier in the tier structure may correspond to connections that have some interactions or some common interests with the user, but fewer than the connections of the first tier have with respect to the user. For users with few connections in a social network, the program may define as few as two tiers for the connection tier structure for that user. For users with many connections in a social network, the program may define as many as ten or more tiers for the connection tier structure for that user.

Figure 3:
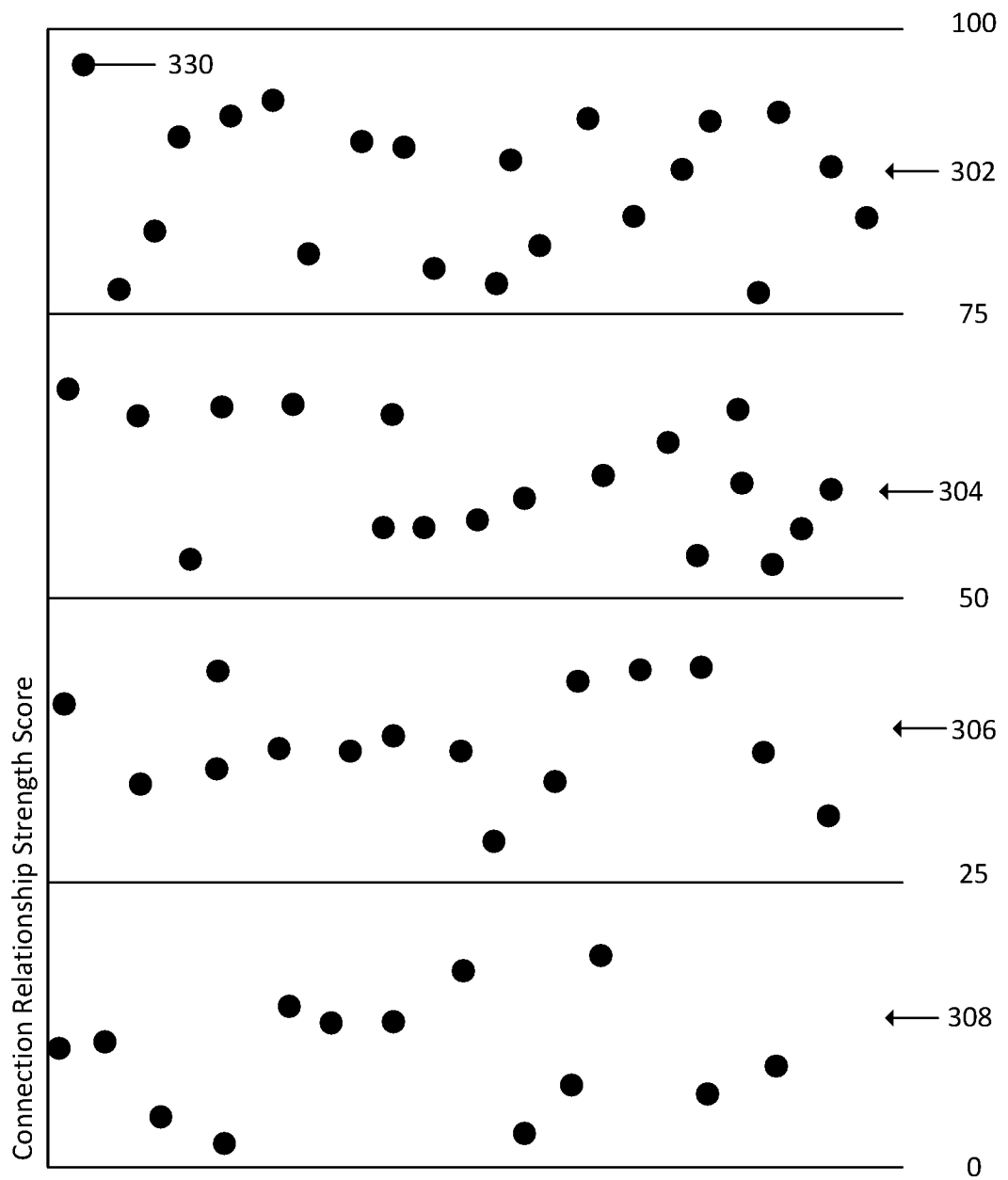
FIG. 3 illustrates a technique for defining a tier structure of connections according to some embodiments of the invention.

The tiers of the tier structure may correspond to respective relationship strength level ranges. The analysis may result in each connection having a relationship strength score, and then it may be determined in which range of the tiers the score belongs. For example, FIG. 3 shows an exemplary embodiment in which a tier structure with four tiers is defined with relationship strength scores spanning from 0 to 100. The Y-axis in FIG. 3 represents the relationship strength, with 0 being the lowest relationship strength and 100 being the highest relationship strength. As shown in FIG. 3, the first level 302 may include relationship strengths in a range between the scores of 75 to 100 and may be considered a first tier. This first level 302 indicates a relationship strength to the user that is greater than the relationship strengths that connections in other tiers would have with respect to the user. In other words, connections which fit into the first level 302 have a closest relationship to the user and have a relationship strength with respect to the user that is greater than the relationship strength that connections from lower tiers have with respect to the user. A second level 304 may include relationship strengths in a range between the scores of 50 to 75 and may be considered a second tier. A third level 306 may include relationship strengths between the scores of 25 to 50 and may be considered a third tier. A fourth level 308 may include relationship strengths in a range between the scores of 0 to 25 and may be considered a fourth tier. A connection belonging to the first level 302 may indicate a heightened level of trust between a user and the connection.

If a K-means clustering technique is used to analyze relationship strength, to define a tier structure, and to assign each connection into a tier of the tier structure, the K for the K-means may represent the number of tiers. For example, if four tiers are defined then the analysis assigns each connection into one of four data clusters. The data corresponds to some type of interaction between connections in the social network. Each data cluster may correspond to a tier.

Figure 4:
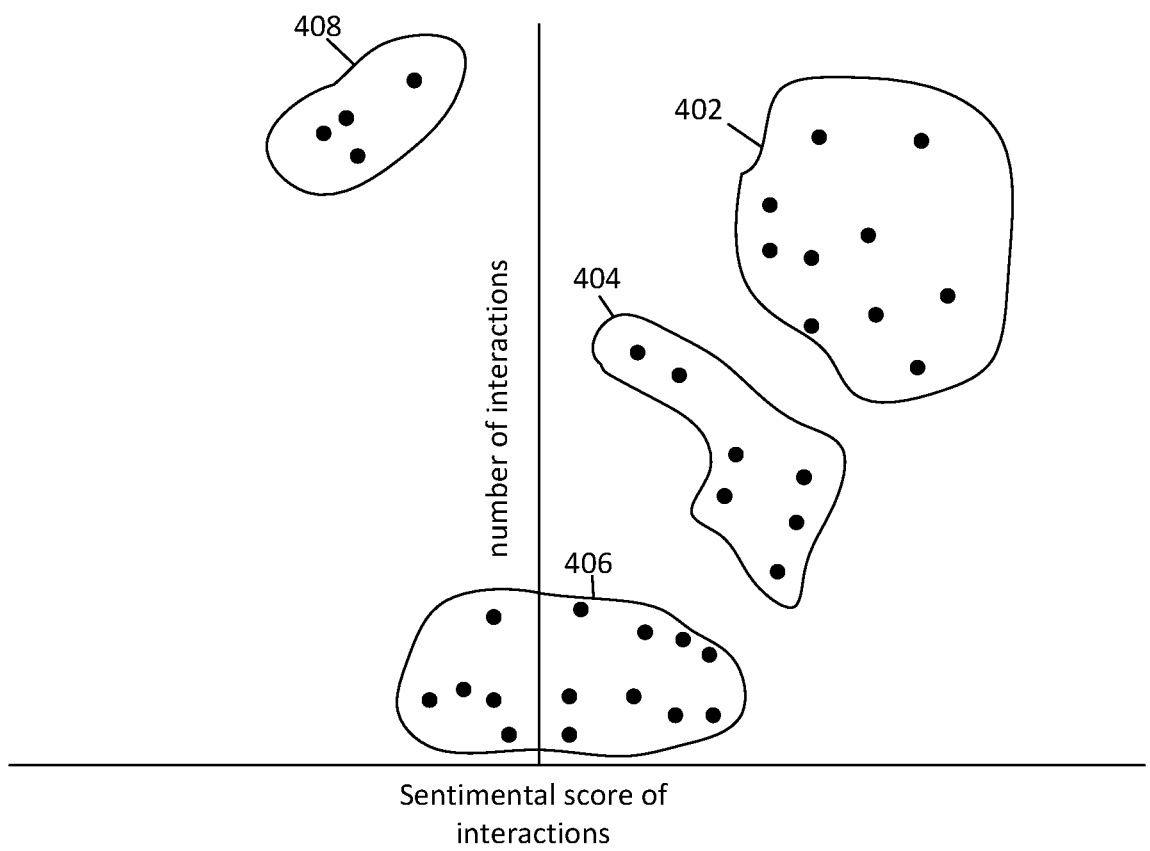
FIG. 4 illustrates an alternative technique for defining a tier structure of connections according to some embodiments of the invention.

FIG. 4 shows an example of relationship strength data clusters being identified in order to define a tier structure of connections. In the embodiment shown in FIG. 4, each dot in the graph represents a relationship score for a connection of a user in a social network. The Y-axis of the graph represents a number of interactions between a respective connection and the user. Because a connection could not have less than zero interactions with the user, there are no points in the negative Y-axis area of the graph. The X-axis of the graph represents a sentimental score for interactions between a user and his or her respective connections in the social network. The sentimental score may, for example, be determined based on a sentiment and tone analysis using natural language processing performed on text recorded from the interactions between the user and his or her connections. The sentiment analysis may be performed on the words of text messages exchanged. The sentiment analysis may be performed on text that is transcribed by a speech-to-text program, after the user has an audio or video conversation with a connection from the social network. Alternatively, the sentiment and tone analysis may be performed using voice analysis software. The graph in FIG. 4 shows that a particular connection may have a positive or a negative sentimental score with respect to his or her interactions with the user.

FIG. 4 shows the tier structure being defined with K-means clustering using a K of four so that four cluster groups are formed. The first cluster 402 includes connections with whom the user has had frequent and highly positive interactions. Thus, the first cluster 402 will be defined as the first tier of the tier connections, e.g. as a tier with the greatest level of relationship to the user. The second cluster 404 includes connections with whom the user has had some interactions of a positive sentimentality. Thus, the second cluster 404 will be defined as the second tier of the tier connections. The third cluster 406 includes connections with whom the user has had few interactions, whether of an overall positive or negative sentimentality. The third cluster 406 will be defined as the third tier of the tier connections. The fourth cluster 408 includes a few connections with whom the user has had interactions having a negative sentimentality score in total. The user has also had more interactions with the connections in fourth cluster 408 than compared to the connections in third cluster 406. Thus, in this embodiment the fourth cluster 408 will be defined as the fourth tier of the tier connections. In other embodiments, the third cluster 406 could be defined as the fourth tier and the fourth cluster 408 could be defined as the third tier if the user chooses to emphasize some frequency of interaction, even if negative, over relatively little interaction.

The analysis may determine a strength of relationship based on a number of interactions between a user and his or her connections, a number of interlinks between a user and his or her connections, a semantic content of interactions between a user and his or her connections, a number of posts shared that are liked by the connection, and/or a number of negative sentiment expressions in interactions between a user and his or her connections. Other interaction data may also be used to analyze and determine a relationship strength. An interlink may be a common connection or a common interest. If two connected users each make public posts about an issue and include similar viewpoints in their posts about the issue, then the interaction data received and analyzed may indicate that one or more interlinks is present between these two participants in a social network. If a user personally checks up on a connection during a public crisis by sending some message to the connection either through the social network or through some other program on a device assigned to the user and their connection, then the interaction data may indicate that the connection belongs in the first tier.

At step 208, each connection of the user in the social network is assigned to one of the tiers of the tier structure based on the determined strength of the relationship. This assigning may occur by determining in which range a strength relationship value or score for a connection would fit. For example, with the embodiment shown in FIG. 3 an important connection 330 may have a relationship strength score of 97, and the program will assign this important connection 330 to the first tier of the tier structure. Each dot in the graph represents a relationship strength score for a respective connection to a single user in the social network. For K-means clustering techniques, the placement may occur by recognizing to which data cluster the interaction data for a connection belongs. FIG. 4 shows how four data clusters are grouped so that each connection is placed into one of the first cluster 402, the second cluster 404, the third cluster 406, or the fourth cluster 408 and, therefore, into one of four tiers of the connection tier structure. The clusters may in some instances be referred to as virtual clusters. In an alternative embodiment the tiers may each be viewed as a ring in a set of concentric circles and the user or content creator is at the center of the set of concentric circles. A first tier would be the closest concentric circle to the center. A second tier would be the next concentric circle outward. A third tier would be the third concentric circle outwards, etc. Each tier or ring would have a different radial distance from the user at the center of the ring, namely from the user to whom all the connections in the set are connected.

When the connections of a first user in a social network are assigned into respective tiers of a tier structure, the program may allow the feedback from connections from the first tier to control propagation of the shared content of the first user to connections in the remaining tiers of the tier structure.

At step 210, an initial propagation of a post, made by the first user in the social network, is limited to connections from the first tier of the tier structure.

Figure 5:
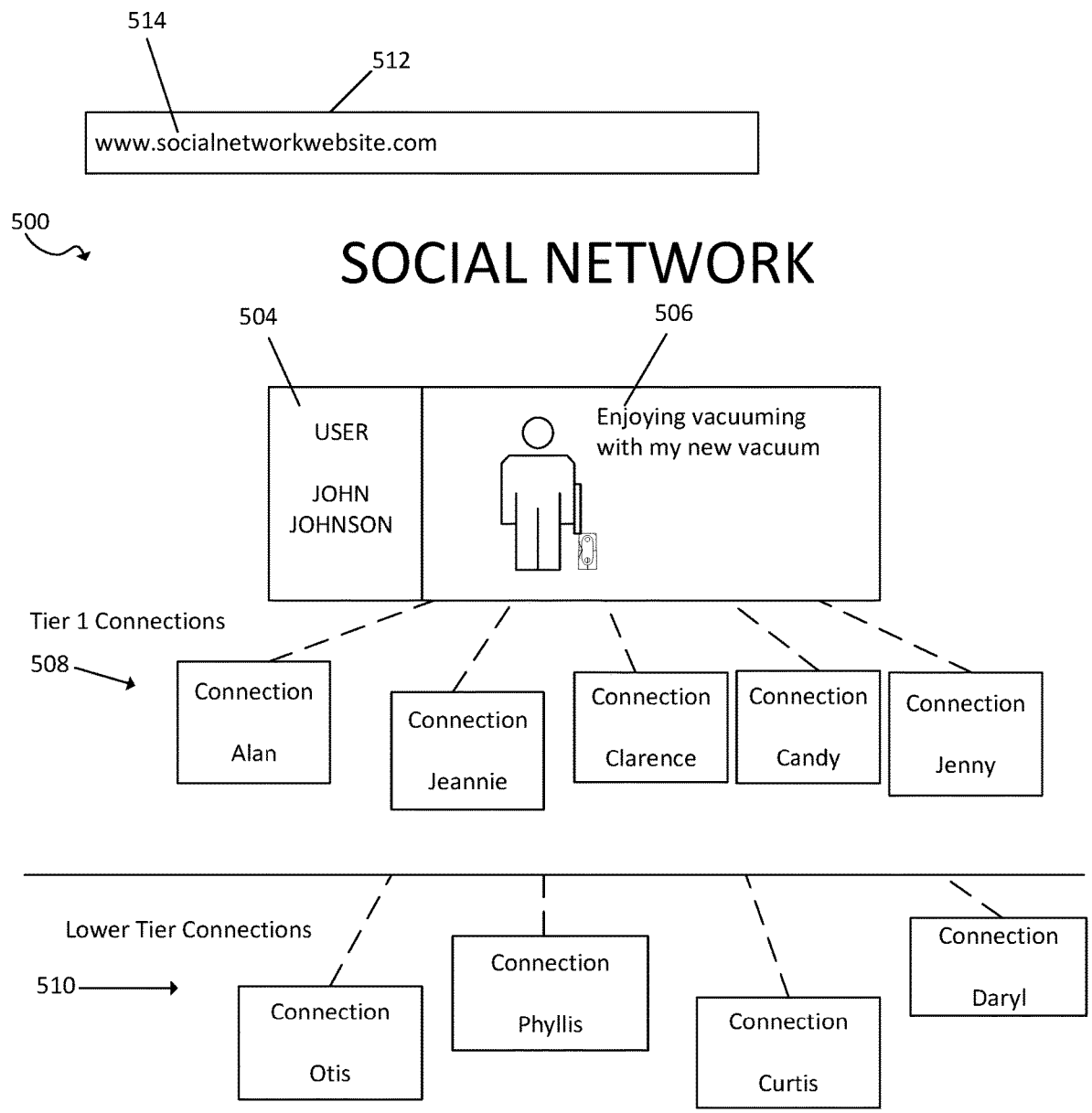
FIG. 5 illustrates an example of a social network user making a post in a social network.

FIG. 5 shows an example of a first user 504, in this instance John Johnson, making a post 506 into a social network 500. The post 506 may be provided in a text form, in a text form with a photo or image, in an audio form, and/or in a video form. FIG. 5 shows how part of a screen may appear to a user who is currently using the social network 500. The first user 504 John Johnson may have that view of the screen. In addition, the Tier 1 connections 508 to first user 504 John Johnson in the social network 500 who have been assigned to a first tier of a tier structure also could view the upper portion of the screen view shown in FIG. 5. FIG. 5 shows Alan, Jeannie, Clarence, Candy, and Jenny as examples of Tier 1 Connections 508 who can see or hear and respond to the post 506 that was made by first user 504 John Johnson. FIG. 5 also shows an address bar 512 in which a URL 514 for the social network website has been entered. This sharing of the post 506 to the Tier 1 Connections 508 is an initial propagation.

FIG. 5 shows that by the time first user 504 John Johnson has made his post 506, the interaction data for him and his connections have already been analyzed to determine their respective relationship strength to him, e.g., using techniques such as those illustrated in FIGS. 3 and/or 4. In addition, by the time first user 504 John Johnson has made his post 506, a tier structure for the connections with multiple tiers has already been defined, and each connection has already been assigned into a respective tier of the tier structure based on the strength of the relationship the particular connection has to the first user 504. FIG. 5 shows that connections Alan, Jeannie, Clarence, Candy and Jenny have been placed into a first tier or into Tier 1 and have been classified as Tier 1 Connections 508. The first tier corresponds to a greatest level of relationship to the first user 504. For example, for the technique shown in FIG. 3 the first tier could be from the first level 302. For the K-means clustering technique illustrated in FIG. 4, the first tier may correspond to the first cluster 402. FIG. 5 also shows that further connections Otis, Phyllis, Curtis, and Daryl have been placed into other tiers of the tier structure and have been classified as lower connections 510. The second, third, and fourth tiers correspond to other levels of relationship to the first user 504, for example may correspond to the second level 304, the third level 306, and the fourth level 308 in the technique shown in FIG. 3 or may correspond to the second cluster 404, the third cluster 406, and the fourth cluster 408 for the K-means clustering technique illustrated in FIG. 4.

For the sake of simplicity, FIG. 5 shows the lower tier connections 510 together even though they may be from various lower tiers, e.g. with some from Tier 2, some from Tier 3, and some from Tier 4, because each of those lower tier connections 510 will initially be blocked or prevented from seeing the post 506 of first user 504, because that post 506 has not yet evolved into or become a matured thread. The initial propagation is limited to the Tier 1 Connections 508. The solid line in FIG. 5 illustrates the lower tier connections 510 being blocked from seeing the post 506, while the Tier 1 Connections 508 can see, hear, or view the post 506. Thus, the initial propagation of the post 506 is limited in a first instance to the Tier 1 connections 508, i.e. to those who have the greatest, e.g., the closest, strength of relationship to the first user 504.

Once any content is posted in a social network site, social connections, e.g. friends, of the original poster in the social network 500 can create a related posting comment and can ask various questions about the first posting in different conversational comments/threads. The original poster can provide answers to those questions. If some points of interest to the social network connections of the original poster are not clear, are not included in the main posting, or are not mentioned in the main post, then the connections of the original poster may ask questions related to the original main posting. At the same time, connections of the original poster may also post additional information related to the original main posting.

Figure 6:
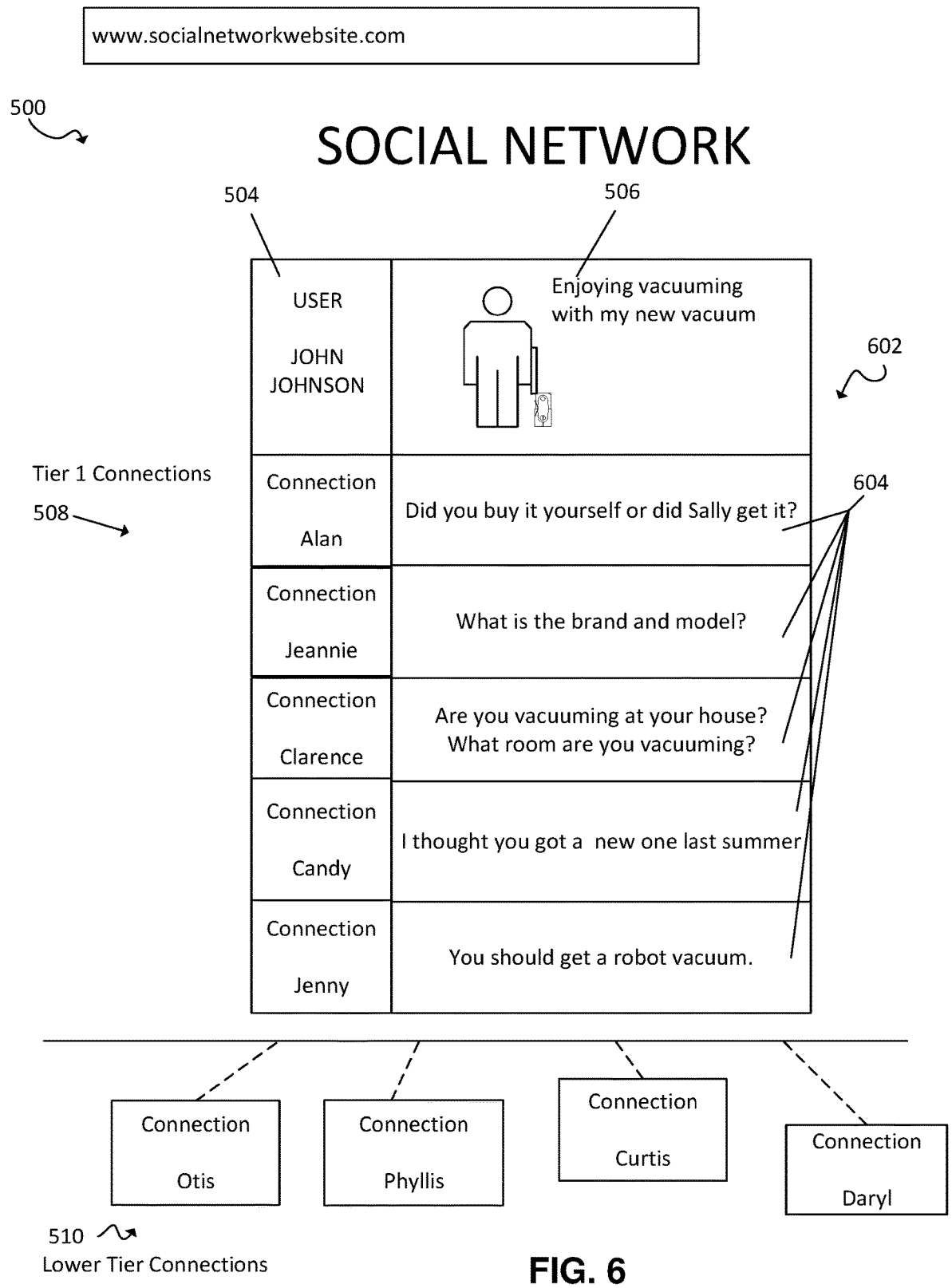
FIG. 6 illustrates an example of social network connections providing feedback to a post in a social network.

FIG. 6 shows an instance after Tier 1 Connections 508 have provided some feedback 604 to the post 506 made by first user 504. Because some feedback 604 has been given to the post 506, a thread 602, e.g. a subject thread, has been created. The post 506 and the feedback 604 together form the thread 602. In this instance, the Tier 1 Connections 508 asked questions to first user 504 about the subject of his post 506 or made comments about the topic. The questions and comments relate to themes of who, what, where, why, and how for the topic of the post 506. Connection Alan asked a who question of whether first user 504 bought the vacuum himself or if someone else bought it. Connection Jeannie asked a what question, namely "what is the brand and model" of the vacuum? Connection Clarence asked a where question about the location of the vacuuming. Connection Candy made a why comment in which she wonders why first user 504 has a new vacuum. Connection Jenny made a how comment by suggesting that another type of vacuum would provide a superior experience.

FIG. 6 shows the feedback 604 provided in the form of text messages that are public to the first user 504 and to the other Tier 1 connections 508. Feedback 604 from the first tier, or from other tiers after a propagation occurs as discussed below, may also come in the form of audio, photo, and/or video responses in addition to the textual feedback.

At the time of the thread evolvement shown in FIG. 6, a maturity level of the thread 602 has not yet passed a first threshold level. Therefore, as depicted in FIG. 6 the lower tier connections 510 are still blocked from seeing or hearing the post 506, are still blocked from seeing or hearing the feedback 604, and are still blocked from seeing or hearing the thread 602.

In an alternative embodiment, in a social network site a person may start a new post that includes content related to travel that the person has done. Close connections of the person may respond to the post in the social network site by adding to the travel thread by asking various questions such as: "What was the duration of your stay?" and "What items did you or your travel partners purchase during your trip?" The original person who posted may often provide in the travel thread answers to those questions. In addition, one or more of the other close connections to the person on the social network site can also provide additional information about the subject of the original post. This additional information may be added at the same time other comments are being entered or at the same time answers are entered by the original person who posted. For example, other connections may enter additional details about the travel such as details about the location or place that was visited.

Figure 7:
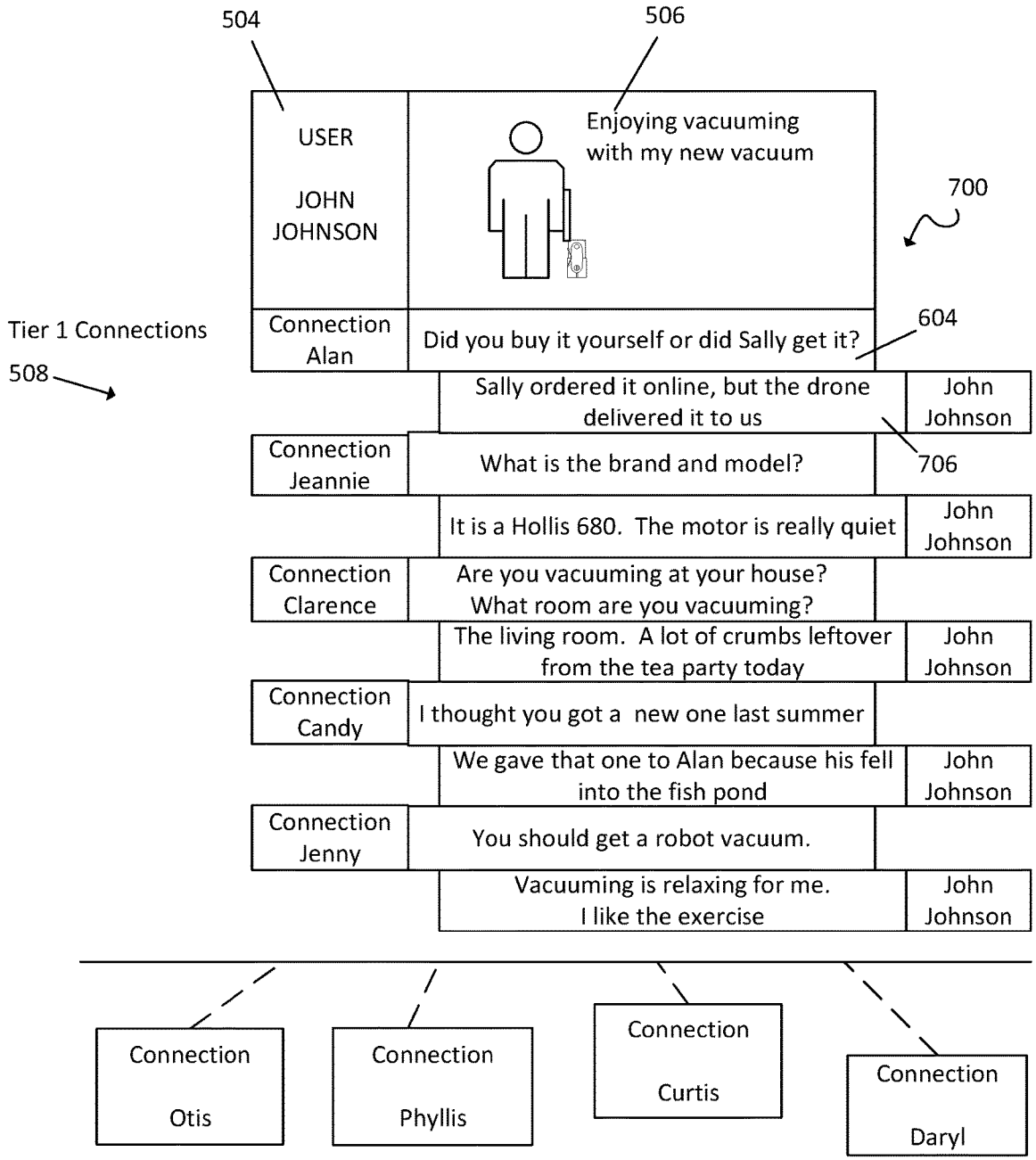
FIG. 7 illustrates an example of a thread in a social network having reached a matured state.

At step 212, feedback 604 to the post 506 is monitored such that a level of maturation of the thread 602 is determined. The feedback 604 is provided by the Tier 1 connections 508 from the first tier of the tier structure. The post 506 and the feedback 604 together form the thread 602. FIGS. 5-7 show examples for when the feedback 604 is monitored according to step 212.

FIG. 7 shows a subsequent instance when first user 504 John Johnson has now provided responses 706 to the feedback 604 that was provided by his Tier 1 Connections 508. In this instance, first user 504 provided a response 706 to each item of feedback 604, namely to each of the questions or comments, that were provided by his Tier 1 Connections 508. The thread 602 has now become a matured thread 700 so that the matured thread 700 is ready for propagation to connections from other tiers of the tier structure. It may now be determined that the matured thread 700 has satisfied a maturity threshold. The responses 706 also help form the thread 602 in addition to the post 506 and the feedback 604 forming the thread 602.

Figure 8:
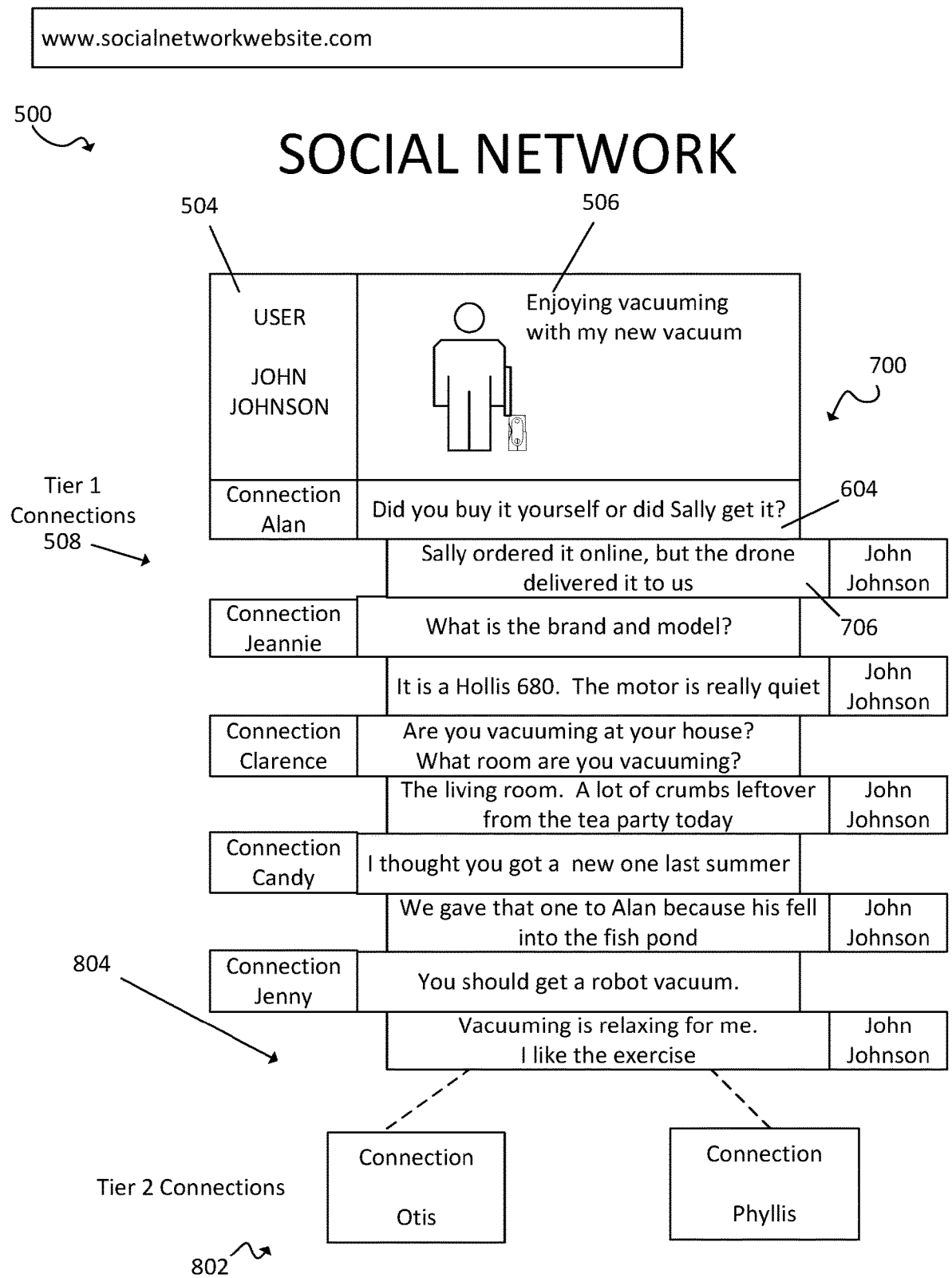
FIG. 8 illustrates an example of a propagation of a thread in a social network to connections from an additional tier in the tier structure of the connections.

FIG. 8 shows an example of a propagation 804 beyond the Tier 1 connections 508, because Tier 2 Connections 802 Otis and Phyllis can now see and/or hear the matured thread 700. At this time, the Tier 1 Connections 508 can still see and/or hear the matured thread 700. Now at this instance after the propagation 804, Tier 1 connections 508 and Tier 2 connections 802 can all provide comments and input into the matured thread 700 to help the discussion further evolve and to help the matured thread 700 mature further. Thus, FIG. 8 shows an example of step 214 of the process illustrated in FIG. 2 of the thread 602 being propagated to Tier 2 connections 802. The propagation 804 may occur in a multi-modal manner in that text, images, audio files, and/or video files can be propagated to additional users in the social network 500.

Figure 9:
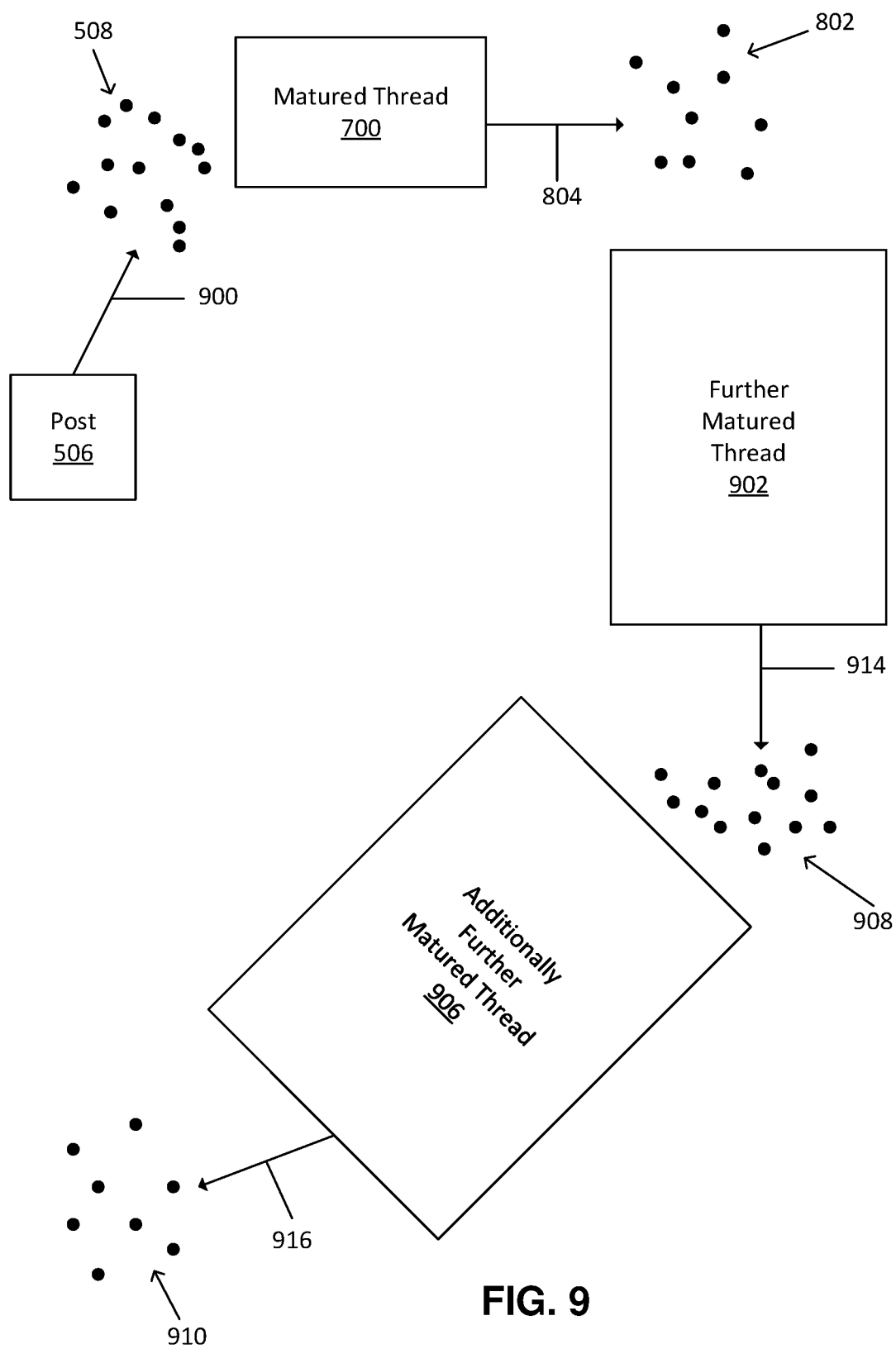
FIG. 9 illustrates an example of thread evolvement and multiple thread propagations occurring to various tiers in a tier structure of connections.

FIG. 9 shows an example of how propagation 804 and additional propagations could occur according to further implementations of the process. FIG. 9 first shows the post 506 (see FIG. 5) that was made by the first user 504 is initially propagated 900 to the Tier 1 connections 508. This step was illustrated in FIGS. 5-6 in which the Tier 1 Connections 508 could see and/or hear the post 506 and could provide feedback 604 to the post 506. The post 506 becomes a thread 602 as shown in FIG. 6 and then becomes a matured thread 700 as shown in FIGS. 7-9 once a first threshold maturity level has been reached. The matured thread 700 is propagated 804, as shown in FIGS. 8 and 9, so that Tier 2 Connections 802 can now also see and/or hear the matured thread 700 and provide further feedback, while the Tier 1 Connections 508 still have access to see and/or hear the matured thread 700 and provide further feedback to the matured thread 700.

If further thread evolution or further thread maturation occurs so that a new maturity threshold level is reached, the matured thread 700 may become a further matured thread 902 which is suitable for a further propagation 914 to Tier 3 Connections 908. At this point after the further propagation 914, Tier 1 Connections 508, Tier 2 Connections 802, and Tier 3 Connections 908 all have access to see and/or hear the further matured thread 902 and to provide additional feedback to the further matured thread 902. The thread maturation and further propagation 914 can be further repeated with an additionally further matured thread 906 that receives an additional propagation 916 to Tier 4 Connections 910. Thereafter, the Tier 1 Connections 508, Tier 2 Connections 802, Tier 3 Connections 908, and Tier 4 Connections 910 all have access to see and/or hear the additionally further matured thread 906 and to provide more or new feedback to the additionally further matured thread 906. With each propagation, a larger total number of connections gains access to see and/or hear and or respond to the content. Thus, the speed of propagation of the social network content may be varied for different tiers.

A maturity or maturity level of a thread 602 may be determined via several techniques. One technique may involve tracking the numbers of users commenting over time. As the number plateaus, the plateauing is one measure that may indicate thread maturity. Another technique is to measure the semantic distance of new comments in the thread 602 as compared to the original post. According to at least one other embodiment, a technique for helping determine thread maturity would be to measure a semantic distance from new comments as compared to feedback 604 that was provided by the Tier 1 connections 508. A semantic distance may be defined as how closely the posted comments and questions relate to the original content. Specifically, the semantic distance may be measured with respect to how the comments (on average) relate to the original content. When the semantic distance from the original post and from the feedback 604 from the first tier reaches some point, e.g., a pre-determined set point, then another maturity threshold level may have been met.

In some embodiments, thread maturity may be determined in that the feedback 604 provided by Tier 1 connections 508 is to press an approval button for a post 506, e.g., to press a like button, or to repost the original post for their own connections to see and/or hear. For these embodiments, a maturity threshold or a maturity threshold level may be reached based on approvals given by Tier 1 connections 508 or by Tier 1 connections 508 reposting the content, without the Tier 1 connections 508 adding their own comments, questions, or supplemental information. In this example, the post 506 or thread 602 may reach a mature form ready for propagation 804 without needing much or any supplemental information or help from the Tier 1 connections 508.

In additional embodiments, cognitive capabilities may be implemented by a plug-in program 130 or by social network program 110a, 110b for determining topic thread maturation using NLP and analytics. For example, content completion could be learned by the programs 130 or 110a, 110b being given examples of what is considered mature content. For example, if a person posts about a trip/vacation, then NLP technology can understand and learn for this topic that thread maturity occurs when basic topic-specific key elements such as who, what, where, why, and how are answered in relation to the trip/vacation. These basics can be considered necessary for a threshold to be crossed to a first level maturity. A higher level of maturity may occur when additional information, such as weather information, personal experience, and likelihood to repeat the same trip again, etc., are present. This higher level of maturity may then trigger propagation to additional tiers of the connections. In at least some embodiments, the computer system can analyze threads using NLP and reinforcement neural network mechanism and explicit/implicit learning feedback in order to learn or define and rank and propose inclusions of new topic elements at a given topic at a specific content maturity level. Calculating of a maturity score for a subject thread may be performed utilizing a cognitive analysis.

Thus, with the propagations to multiple tiers, in some embodiments the disclosure may include a multi-tier propagation or a multi-path propagation of the social network content.

According to at least one embodiment, a thread 602 may be divided up into various topics and disbursed via interest expressed by various connections over time via historical preferences, semantic language processing, and a correlation mechanism.

In some embodiments, a user may enter information manually to help guide the organization of the tiers of the tier structure. For example, the user may provide pre-defined preferences through a GUI for organizing the tiers to control propagation of the social network post/thread. In other instances, the user may dynamically provide information through a GUI to help organize the tiers to control propagation of the social network post/thread. For example, if a user has identified through a GUI that statistical information appended to the original post is inaccurate, the user may restrict initial propagation growth of the social network content to those connections who like the statistical information or to those who have a tendency to append or validate existing thread content.

FIG. 10 illustrates further features implemented in some embodiments of the process according to the invention. FIG. 10 shows an instance of thread evolvement for thread 602 that became a matured thread 700. FIG. 10 shows that Phyllis and Otis who are Tier 2 Connections 802 contributed to the matured thread 700. Phyllis made a comment 1004. Otis asked a question 1006. These contributions from Tier 2 Connections 802 will help the matured thread 700 mature further to eventually reach a state of being a further matured thread 902 as illustrated in FIG. 9 which would be ready for a further propagation 914 to Tier 3 Connections 908.

FIG. 10 also shows that an example of an embodiment in which plug-in program 130 shown in FIG. 1 or the social network program 110b operated at the server 112 prompt the first user 504 at computer 102 to help the matured thread 700 further mature. The matured thread 700 may have been analyzed as well as past threads in the social network 500 using NLP, reinforcement neural network mechanism, and/or explicit/implicit learning feedback in order to learn or define and rank and propose inclusions of new topic elements for a given topic at a specific content maturity level. The plug-in program 130 or social network program 110b may recognize that it would be appropriate to foster comments or contributions regarding, for example, (A) further conditions at which the activity discussed in the post 506 and in the thread 602 and matured thread 700 took place and (B) a satisfaction level of the first user 504 regarding the activity discussed. FIG. 10 shows that the plug-in program 130 or the social network program 110b itself may provide prompts 1002 into the matured thread 700 to attempt to create additional thread evolvement. FIG. 10 shows two such prompts 1002 provided by the plug-in program 130 or by the social network program 110b. The plug-in program 130 or the social network program 110b may have recognized that further prompts 1002 were appropriate, because thread topics for who, what, where, why, and how had already been entered into the matured thread 700 via Tier 1 connections 508 and the first user 504.

Figure 11:
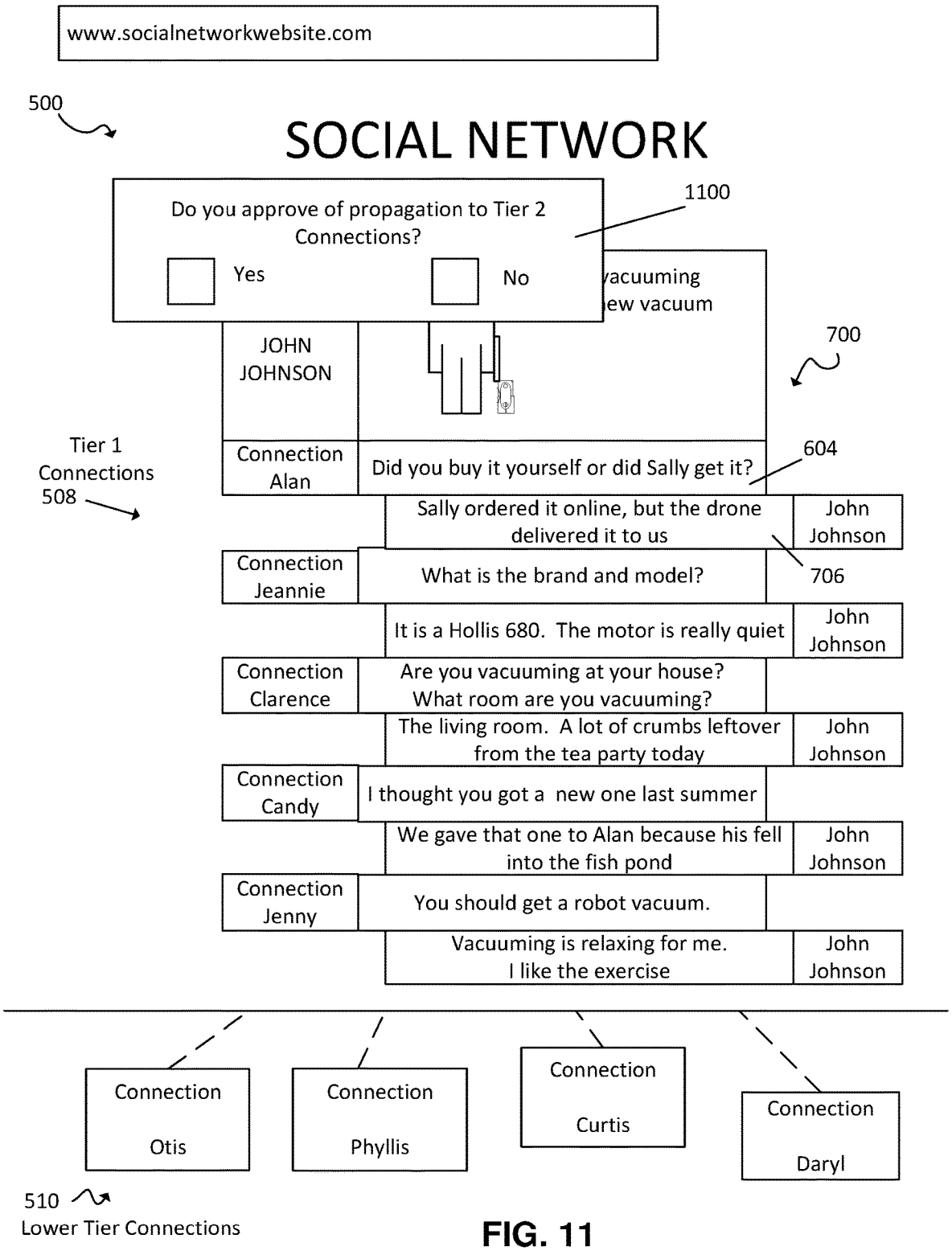
FIG. 11 illustrates an example of an additional embodiment according to the invention in which the program expressly asks a user for permission to propagate a thread after a thread maturity threshold level has been reached.

FIG. 11 shows an example of an additional feature performed in some embodiments of the present invention. This embodiment illustrates a point near in time to that shown in FIG. 7 in which the thread 602 has matured to become a matured thread 700. The matured thread 700 has been deemed ready for propagation 804 to the second tier, but a GUI is generated to ask the first user 504, i.e. to query the first user 504, for express authorization to propagate 804 the matured thread 700 to additional connections from other tiers. FIG. 11 shows a viewpoint that would occur at the computer screen of the first user 504 and shows that a propagation authorization request GUI 1100 to the first user 504 is generated. The first user 504 can click yes to approve the propagation 804 or could click no to prevent the propagation 804 to Tier 2 connections 802. Such a query of a user may occur initially before a maturity threshold of a thread 602 is reached, may occur when a maturity level is reached, or may occur when subsequent maturity levels are reached. If a user manually via a GUI approves content propagation to an additional tier for a certain thread maturity level, the plug-in program 130 or the social network program 110a, 110b may in some embodiments, for new threads from the user, assume approval of propagation to additional tiers when a similar thread maturity level is reached.

If the first user 504 clicks the Yes box in propagation authorization request GUI 1100 to authorize a propagation 804, then the propagation 804 shown in FIGS. 8 and 9 to Tier 2 connections 802 may be performed. Additionally if the first user 504 clicks the Yes box in propagation authorization request GUI 1100 to authorize a propagation 804, then the consent given may be recorded in a database 114a or 114b, and NLP may be used to analyze future threads of the first user 504 and to compare thread maturity threshold levels. Once a thread maturity threshold level for a future thread reaches a maturity level equal or similar to the maturity level for matured thread 700, the plug-in program 130 or the social network program 110a, 110b may assume approval by the first user 504 for future thread propagation of this future thread.

According to some embodiments, a cognitive analysis may be performed on various data sources to analyze interactions of a user and connections in a social network 500, to determine a strength of relationship between a user and his or her connections in the social network 500, to define a tier structure of connections, to assign each connection of the user to a respective tier of the tier structure, and to determine a level of maturation of a thread 602. Calculating of a maturity score for a subject thread may be performed utilizing a cognitive analysis.

The cognitive analysis or analyses may include classifying natural language, analyzing tone, analyzing sentiment, analyzing semantic content, etc., perhaps including scanning for keywords, key phrases, etc. of previous online content, as well as other information related to the content.

As such, in some embodiments, the methods and/or systems described herein may utilize "machine learning," "cognitive modeling," "cognitive analysis," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the maturity level of content, the strength of content creators' relationships with other viewers, maturity level thresholds for a subject thread, and a suitable tier structure based on relationship strengths to a common user. Utilizing the models, the performance (or operation) of the system (e.g., utilizing/based on new inputs) may be predicted and/or the performance of the system may be improved by investigating how changes in the input(s) effect the output(s). Users may provide feedback on the models, thus allowing the performance/accuracy of the system to improve over time.

As described in embodiments above, the plug-in program 130 or the social network program 110a, 110b may improve the functionality of a computer by facilitating more efficient movement of shared content through a social network 500. A processor organizing social network connections into various tiers based on a level of relationship helps more efficiently use computing resources of the social network 500. Primary computing resources of the social network 500 may be focused or reserved for communication of a user with those connections who are closest to the user.

It may be appreciated that FIGS. 2-11 provide illustrations of respective embodiments and do not imply any limitations regarding how different embodiments may be implemented. Many modifications to the depicted embodiment(s) may be made based on design and implementation requirements.

Figure 12:
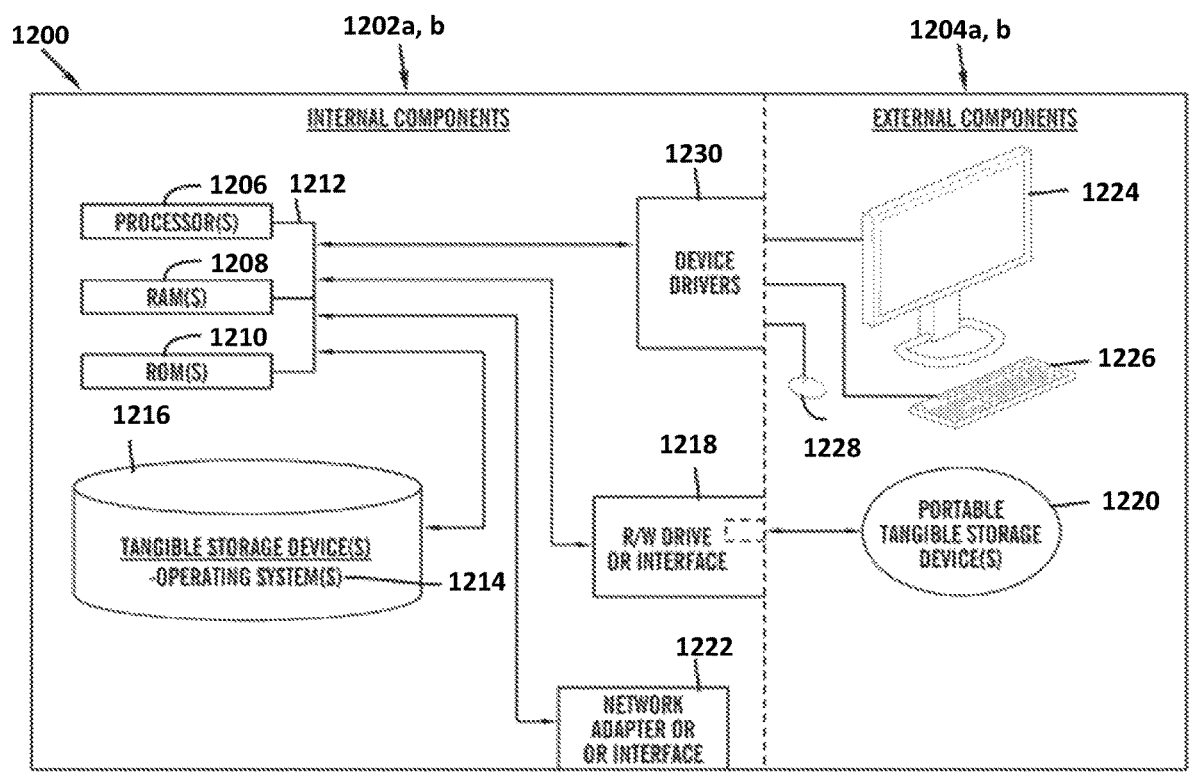
FIG. 12 is a block diagram of internal and external components of computers and servers depicted in FIG. 1 according to at least one embodiment.

FIG. 12 is a block diagram 1200 of internal and external components of computers depicted in FIG. 1 in accordance with an illustrative embodiment of the present invention. It should be appreciated that FIG. 12 provides only an illustration of one implementation and does not imply any limitations with regard to the environments in which different embodiments may be implemented. Many modifications to the depicted environments may be made based on design and implementation requirements.

Data processing system 1202, 1204 is representative of any electronic device capable of executing machine-readable program instructions. Data processing system 1202, 1204 may be representative of a smart phone, a computer system, PDA, or other electronic devices. Examples of computing systems, environments, and/or configurations that may represented by data processing system 1202, 1204 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102, network server 112, and additional server 120 shown in FIG. 1 may include respective sets of internal components 1202a, b and external components 1204a, b illustrated in FIG. 12. Each of the sets of internal components 1202a, b includes one or more processors 1206, one or more computer-readable RAMs 1208 and one or more computer-readable ROMs 1210 on one or more buses 1212, and one or more operating systems 1214 and one or more computer-readable tangible storage devices 1216. The one or more operating systems 1214, the software program 108, and the social network program 110a in client computer 102, the social network program 110b in network server 112, and the plug-in program 130 in additional server 120 may be stored on one or more computer-readable tangible storage devices 1216 for execution by one or more processors 1206 via one or more RAMs 1208 (which typically include cache memory). In the embodiment illustrated in FIG. 12, each of the computer-readable tangible storage devices 1216 is a magnetic disk storage device of an internal hard drive. Alternatively, each of the computer-readable tangible storage devices 1216 is a semiconductor storage device such as ROM 1210, EPROM, flash memory or any other computer-readable tangible storage device that can store a computer program and digital information.

Each set of internal components 1202a, b also includes a R/W drive or interface 1218 to read from and write to one or more portable computer-readable tangible storage devices 1220 such as a CD-ROM, DVD, memory stick, magnetic tape, magnetic disk, optical disk or semiconductor storage device. A software program, such as the software program 108, the social network programs 110a, 110b, and the plug-in program 130 can be stored on one or more of the respective portable computer-readable tangible storage devices 1220, read via the respective R/W drive or interface 1218 and loaded into the respective hard drive 1216.

Each set of internal components 1202a, b may also include network adapters (or switch port cards) or interfaces 1222 such as a TCP/IP adapter cards, wireless wi-fi interface cards, or 3G or 4G wireless interface cards or other wired or wireless communication links. The software program 108 and the social network program 110a in client computer 102, the social network program 110b in network server computer 112, and the social network plug-in program 130 in additional server 120 can be downloaded from an external computer (e.g., server) via a network (for example, the Internet, a local area network or other, wide area network) and respective network adapters or interfaces 1222. From the network adapters (or switch port adaptors) or interfaces 1222, the software program 108 and the social network program 110a in client computer 102 and the social network program 110b in network server computer 112 and the social network plug-in program 130 from additional server computer 120 are loaded into the respective hard drive 1216. The network may comprise copper wires, optical fibers, wireless transmission, routers, firewalls, switches, gateway computers and/or edge servers.

Each of the sets of external components 1204a, b can include a computer display monitor 1224, a keyboard 1226, and a computer mouse 1228. External components 1204a, b can also include touch screens, virtual keyboards, touch pads, pointing devices, and other human interface devices. Each of the sets of internal components 1202a, b also includes device drivers 1230 to interface to computer display monitor 1224, keyboard 1226 and computer mouse 1228. The device drivers 1230, R/W drive or interface 1218 and network adapter or interface 1222 comprise hardware and software (stored in storage device 1216 and/or ROM 1210).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
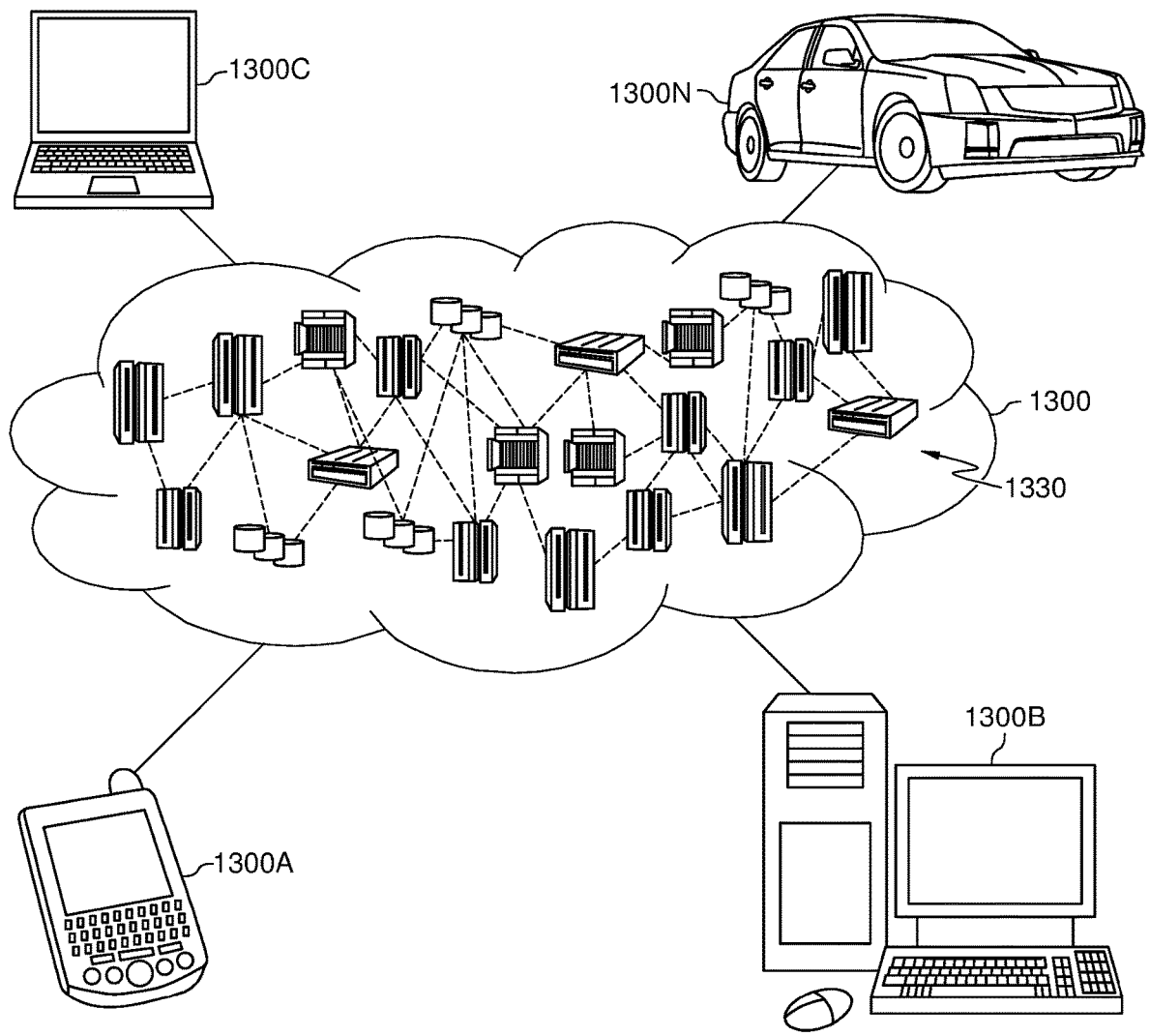
FIG. 13 is a block diagram of an illustrative cloud computing environment including the computer system depicted in FIG. 1 according to at least one embodiment.

Referring now to FIG. 13, illustrative cloud computing environment 1300 is depicted. As shown, cloud computing environment 1300 includes one or more cloud computing nodes 1330 with which local computing devices used by cloud consumers, such as, for example, personal digital assistant (PDA) or cellular telephone 1300A, desktop computer 1300B, laptop computer 1300C, and/or automobile computer system 1300N may communicate. Nodes 1330 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 1300A-N shown in FIG. 13 are intended to be illustrative only and that computing nodes 1330 and cloud computing environment 1300 can communicate with any type of computerized device over any type of network and/or network addressable connection (e.g., using a web browser).

Figure 14:
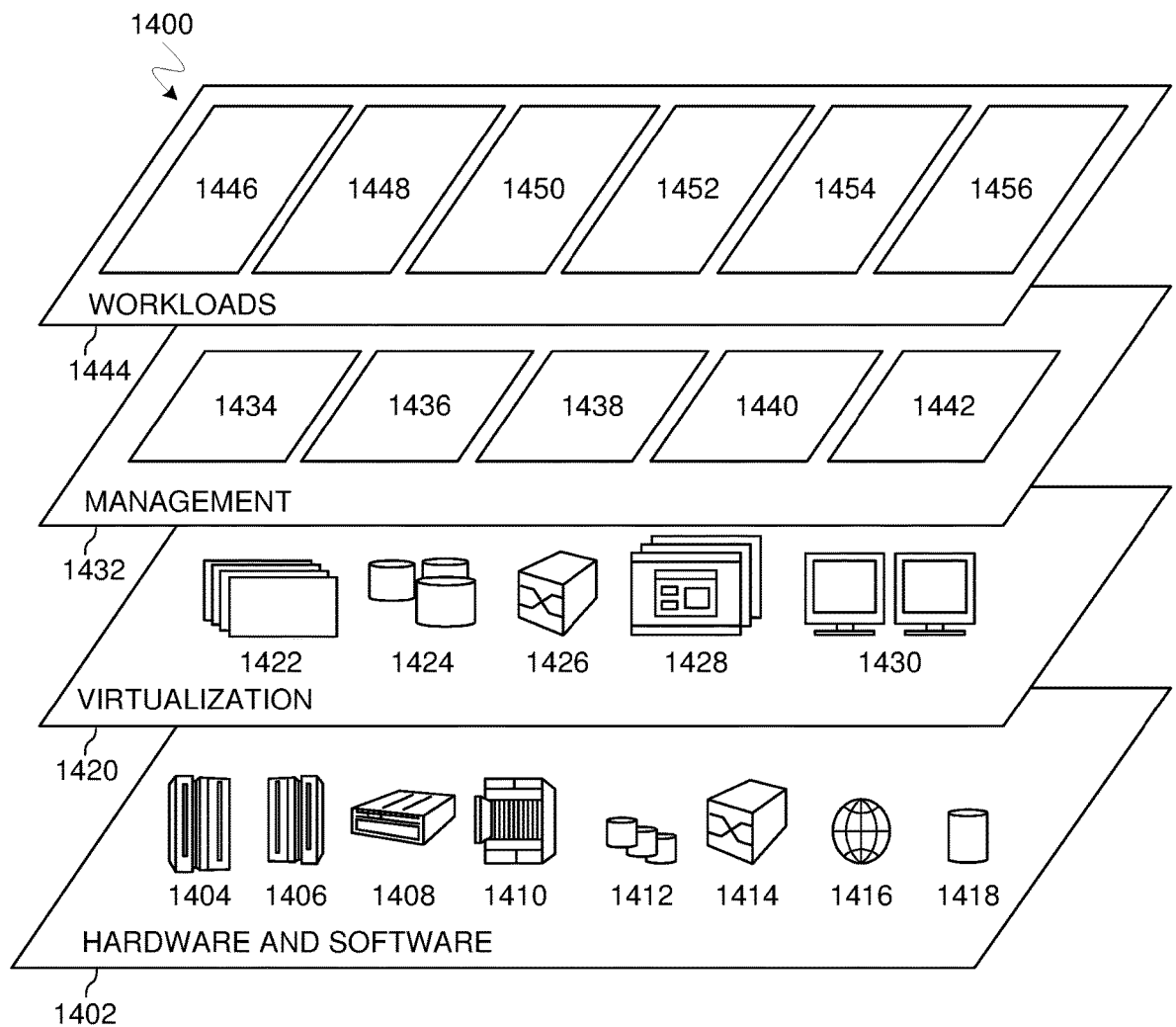
FIG. 14 is a block diagram of functional layers of the illustrative cloud computing environment of FIG. 13 in accordance with an embodiment of the present invention.

Referring now to FIG. 14, a set of functional abstraction layers 1400 provided by cloud computing environment 1300 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1402 includes hardware and software components. Examples of hardware components include: mainframes 1404; RISC (Reduced Instruction Set Computer) architecture based servers 1406; servers 1408; blade servers 1410; storage devices 1412; and networks and networking components 1414. In some embodiments, software components include network application server software 1416 and database software 1418.

Virtualization layer 1420 provides an abstraction layer from which the following examples of virtual entities may be provided: virtual servers 1422; virtual storage 1424; virtual networks 1426, including virtual private networks; virtual applications and operating systems 1428; and virtual clients 1430.

In one example, management layer 1432 may provide the functions described below. Resource provisioning 1434 provides dynamic procurement of computing resources and other resources that are utilized to perform tasks within the cloud computing environment. Metering and Pricing 1436 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1438 provides access to the cloud computing environment for consumers and system administrators. Service level management 1440 provides cloud computing resource allocation and management such that required service levels are met. Service Level Agreement (SLA) planning and fulfillment 1442 provides pre-arrangement for, and procurement of, cloud computing resources for which a future requirement is anticipated in accordance with an SLA.

Workloads layer 1444 provides examples of functionality for which the cloud computing environment may be utilized. Examples of workloads and functions which may be provided from this layer include: mapping and navigation 1446; software development and lifecycle management 1448; virtual classroom education delivery 1450; data analytics processing 1452; transaction processing 1454; and social network relationship analysis, social network connection tier defining, connection assignment, and thread maturation level analysis 1456. The functionalities of social network relationship analysis, social network connection tier defining, connection assignment, and thread maturation level analysis were described in the aforementioned embodiments of the present invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method performed by one or more processors, the method comprising:
    receiving interaction data from a first user of a social network and from additional users of the social network, wherein the additional users are connections of the first user in the social network, wherein the connections were established via an invitation being extended between the first user and each of the additional users and via an acceptance of the invitation from the first user or from each of the additional users;
    analyzing the interaction data to determine a strength of relationship for each connection with respect to the first user;
    defining a tier structure in the social network for the connections of the first user, wherein the tier structure comprises tiers, wherein each tier of the tier structure corresponds to a strength level of the relationship, and wherein a first tier of the tier structure corresponds to a greatest level of the relationship to the first user;
    assigning each connection of the first user in the social network to one of the tiers of the tier structure based on the strength of the relationship;
    limiting, for a post of the first user in the social network, an initial propagation of the post to connections of the first tier;
    monitoring feedback to the post in the social network to determine a level of maturation of a thread, the feedback being provided by the connections of the first tier, the post and the feedback together forming the thread; and
    in response to determining that the thread has satisfied a maturity threshold, propagating the thread to connections of a second tier of the tier structure.

2. The computer-implemented method according to claim 1, wherein the interaction data comprises data produced from direct interactions of the first user and the additional users.

3. The computer-implemented method according to claim 1, wherein the interaction data comprises data produced from direct interactions of the first user and the additional users in the social network.

4. The computer-implemented method according to claim 1, wherein the interaction data comprises data produced from indirect interactions of the first user and the connections in the social network, and wherein the indirect interactions are to a common first object in the social network.

5. The computer-implemented method according to claim 1, further comprising:
    monitoring further feedback in the thread in the social network; and
    in response to determining that the thread has satisfied a further maturity threshold, propagating the thread to connections of a third tier of the tier structure.

6. The computer-implemented method according to claim 1, wherein at least one of the defining and the assigning comprises performing K-means clustering.

7. The computer-implement method according to claim 1, wherein the monitoring comprises performing natural language processing that implements topic-specific key elements.

8. A computer system for tier structure definition and for control of multi-tier propagation of social network content, the computer system comprising:
    one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
    receiving interaction data from a first user of the social network and from additional users of a social network, wherein the additional users are connections of the first user in the social network, wherein the connections were established via an invitation being extended between the first user and each of the additional users and via an acceptance of the invitation from the first user or from each of the additional users;
    analyzing the interaction data to determine a strength of relationship for each connection with respect to the first user;
    defining a tier structure in the social network for the connections of the first user, wherein the tier structure comprises tiers, wherein each tier of the tier structure corresponds to a strength level of the relationship, and wherein a first tier of the tier structure corresponds to a greatest level of the relationship to the first user;
    assigning each connection of the first user in the social network to one of the tiers of the tier structure based on the strength of the relationship;

limiting, for a post of the first user in the social network, an initial propagation of the post to connections of the first tier;

monitoring feedback to the post in the social network to determine a level of maturation of a thread, the feedback being provided by the connections of the first tier, the post and the feedback together forming the thread; and in response to determining that the thread has satisfied a maturity threshold, propagating the thread to connections of a second tier of the tier structure.

9. The computer system according to claim 8, wherein the interaction data comprises data produced from direct interactions of the first user and the additional users.

10. The computer system according to claim 8, wherein the interaction data comprises data produced from direct interactions of the first user and the additional users in the social network.

11. The computer system according to claim 8, wherein the interaction data comprises data produced from indirect interactions of the first user and the connections in the social network, and wherein the indirect interactions are to a common first object in the social network.

12. The computer system according to claim 8, wherein the method further comprises:

monitoring further feedback in the thread in the social network; and in response to determining that the thread has satisfied a further maturity threshold, propagating the thread to connections of a third tier of the tier structure.

13. The computer system according to claim 8, wherein at least one of the defining and the assigning comprises performing K-means clustering.

14. The computer system according to claim 8, wherein the monitoring comprises performing natural language processing that implements topic-specific key elements.

15. A computer program product for tier structure definition and for control of multi-tier propagation of social network content, the computer program product comprising a computer-readable storage media having program instructions embodied therewith, the program instructions being executable by a processor to cause the processor to perform a method comprising:

receiving interaction data from a first user of the social network and from additional users of a social network, wherein the additional users are connections of the first user in the social network, wherein the connections were established via an invitation being extended between the first user and each of the additional users and via an acceptance of the invitation from the first user or from each of the additional users;

analyzing the interaction data to determine a strength of relationship for each connection with respect to the first user;

defining a tier structure in the social network for the connections of the first user, wherein the tier structure comprises tiers, wherein each tier of the tier structure corresponds to a strength level of the relationship, and wherein a first tier of the tier structure corresponds to a greatest level of the relationship to the first user;

assigning each connection of the first user in the social network to one of the tiers of the tier structure based on the strength of the relationship;

limiting, for a post of the first user in the social network, an initial propagation of the post to connections of the first tier;

monitoring feedback to the post in the social network to determine a level of maturation of a thread, the feedback being provided by the connections of the first tier, the post and the feedback together forming the thread; and in response to determining that the thread has satisfied a maturity threshold, propagating the thread to connections of a second tier of the tier structure.

16. The computer program product according to claim 15, wherein the interaction data comprises data produced from direct interactions of the first user and the additional users.

17. The computer program product according to claim 15, wherein the interaction data comprises data produced from direct interactions of the first user and the additional users in the social network.

18. The computer program product according to claim 15, wherein the interaction data comprises data produced from indirect interactions of the first user and the connections in the social network, and wherein the indirect interactions are to a common first object in the social network.

19. The computer program product according to claim 15, wherein the method further comprises:

monitoring further feedback in the thread in the social network; and in response to determining that the thread has satisfied a further maturity threshold, propagating the thread to connections of a third tier of the tier structure.

20. The computer program product according to claim 15, wherein at least one of the defining and the assigning comprises performing K-means clustering.

* * * * *